(12) United States Patent
Abe et al.

(10) Patent No.: US 10,800,922 B2
(45) Date of Patent: Oct. 13, 2020

(54) PIGMENT COMPOSITION PRODUCTION METHOD

(71) Applicant: KAO CORPORATION, Tokyo (JP)

(72) Inventors: Shuichi Abe, Wakayama (JP); Tsuyoshi Oda, Wakayama (JP); Toshiya Iwasaki, Iwade (JP); Masayuki Narita, Ichikawa (JP)

(73) Assignee: KAO CORPORATION, Tokyo (JP)

( * ) Notice: Subject to any disclaimer, the term of this patent is extended or adjusted under 35 U.S.C. 154(b) by 172 days.

(21) Appl. No.: 15/767,280

(22) PCT Filed: Oct. 4, 2016

(86) PCT No.: PCT/JP2016/079555
§ 371 (c)(1),
(2) Date: Apr. 10, 2018

(87) PCT Pub. No.: WO2017/065063
PCT Pub. Date: Apr. 20, 2017

(65) Prior Publication Data
US 2019/0062559 A1 Feb. 28, 2019

(30) Foreign Application Priority Data

Oct. 13, 2015 (JP) .................... 2015-202026
Sep. 6, 2016 (JP) .................... 2016-174013

(51) Int. Cl.
| | | |
|---|---|---|
| C09D 11/037 | (2014.01) | |
| C09B 29/33 | (2006.01) | |
| C09B 67/20 | (2006.01) | |
| C09B 67/46 | (2006.01) | |
| C09B 67/22 | (2006.01) | |
| C09D 11/107 | (2014.01) | |
| C09D 11/322 | (2014.01) | |

(52) U.S. Cl.
CPC .......... C09B 29/332 (2013.01); C09B 67/009 (2013.01); C09B 67/0046 (2013.01); C09B 67/0066 (2013.01); C09D 11/037 (2013.01); C09D 11/107 (2013.01); C09D 11/322 (2013.01)

(58) Field of Classification Search
CPC .............. C09B 29/332; C09B 67/0046; C09B 67/0066; C09B 67/009; C09D 11/037; C09D 11/107; C09D 11/322
USPC ........................................................ 523/160
See application file for complete search history.

(56) References Cited

U.S. PATENT DOCUMENTS

| | | |
|---|---|---|
| 6,432,192 B1 | 8/2002 | Cook et al. |
| 2007/0169665 A1 | 7/2007 | Schweikart et al. |
| 2008/0115695 A1 | 5/2008 | Sujeeth et al. |

FOREIGN PATENT DOCUMENTS

| | | |
|---|---|---|
| CN | 1926199 A | 3/2007 |
| JP | 07-126545 A | 5/1995 |
| JP | 2003-524055 A | 8/2003 |
| JP | 2004-123866 A | 4/2004 |
| JP | 2008-063524 A | 3/2008 |
| JP | 2010-508426 A | 3/2010 |
| JP | 2014-177575 A | 9/2014 |
| JP | 2016-023267 A | 2/2016 |

OTHER PUBLICATIONS

Machine Translation of JP 2016-023267 (Year: 2016).*
International Search Report for PCT/JP2016/079555 (PCT/ISA/210) dated Nov. 29, 2016.
Poskocil et al., "Aromatische Diazo- und Azoverbindungen XXXIV. Abspaltung der Acetylgruppe Aus den Von Acetoacetanilid Aegeleiteten Azofarbstoffen und die Darstellung Neuer Formazan-Farbstoffe", Collection of Czechoslovak Chemical Communications, 1959, vol. 24, pp. 3746-3753.
Extended European Search Report, dated May 8, 2019, for European Application No. 16855317.0.
U.S. Appl. No. 15/767,929, filed Apr. 12, 2018.

* cited by examiner

*Primary Examiner* — Hannah J Pak
(74) *Attorney, Agent, or Firm* — Birch, Stewart, Kolasch & Birch, LLP

(57) ABSTRACT

The present invention relates to [1] a process for producing a pigment composition, including the step of subjecting a raw material pigment composition containing PY74 and a specific by-product to a treatment with an oxidizing agent, in which a content of the specific by-product in the pigment composition after the treatment on the basis of a content of PY74 in the pigment composition after the treatment is not more than 1,200 mg/kg; [2] a process for producing a pigment composition, including the step of subjecting a raw material pigment composition containing PY74, a specific by-product and water to a treatment with hydrogen peroxide; [3] a method of reducing a content of a specific by-product in a raw material pigment composition containing PY74 and the specific by-product, said method including the step of subjecting the raw material pigment composition to a treatment with an oxidizing agent; and [4] a method of preventing an ink for ink-jet printing from suffering from ejection defects, including the step of compounding the pigment composition produced by any of the aforementioned processes in the ink for ink-jet printing.

17 Claims, No Drawings

PIGMENT COMPOSITION PRODUCTION METHOD

FIELD OF THE INVENTION

The present invention relates to a process for producing a pigment composition containing C.I. Pigment Yellow 74, a method of reducing a content of a by-product in a raw material pigment composition, and a method of preventing occurrence of ejection defects of an ink for ink-jet printing.

BACKGROUND OF THE INVENTION

In ink-jet printing methods, droplets of ink are directly projected onto a printing medium from very fine nozzles and allowed to adhere to the printing medium to form characters or images thereon. The ink-jet printing methods have now been employed not only in printing applications for ordinary consumers, but also recently in commercial and industrial printing applications because of various advantages such as easiness of full coloration, low cost, capability of using a plain paper as the printing medium, non-contact with printed characters or images, etc. As a pigment for a yellow ink used in the ink-jet printing methods, C.I. Pigment Yellow 74 has been extensively used.

JP 7-126545A (Patent Literature 1) discloses a process for producing a disazo pigment having a low amine content, in which an oxidizing agent is added to a disazo pigment slurry to subject an excessive amount of acetanilides to oxidative decomposition.

JP 2003-524055A (Patent Literature 2) discloses a process for producing a purified aqueous pigment dispersion, in which an aqueous pigment dispersion containing an impurity is subjected to cross flow filtration to remove at least a part of the impurity therefrom. In Examples of the Patent Literature 2, it is also described that membrane purification (ultrafiltration) was carried out on C.I. Pigment Yellow 74.

In addition, JP 2010-508426A (Patent Literature 3) discloses a method for producing a modified pigment by sulfonating a pigment such as C.I. Pigment Yellow 19, etc., and subsequently oxidizing the pigment.

SUMMARY OF THE INVENTION

The present invention relates to a process for producing a pigment composition, including the step of subjecting a raw material pigment composition containing C.I. Pigment Yellow 74 and a compound (I) represented by the below-mentioned formula (I-1) or (I-2) to a treatment with an oxidizing agent, in which a content of the compound (I) in the pigment composition after the treatment with the oxidizing agent on the basis of a content of the C.I. Pigment Yellow 74 in the pigment composition after the treatment with the oxidizing agent is not more than 1,200 mg/kg.

DETAILED DESCRIPTION OF THE INVENTION

In the technologies of the aforementioned Patent Literatures 1 to 3, the pigment compositions described therein containing C.I. Pigment Yellow 74 and its marginal compounds are still insufficient in ejection properties after storing the pigment compositions for a long period of time. Therefore, it has been required to further improve ejection properties of the pigment compositions so as to prevent occurrence of ejection defects after storing the compositions for a long period of time.

The present applicant has already found that the ink composition containing C.I. Pigment Yellow 74 (hereinafter also referred to merely as "PY74") and a compound (I) represented by the following formula (I-1) or (I-2) (a derivative of PY74) in which the latter compound (I) is present in an amount of 1 to 50 mg/kg in the ink composition hardly suffers from occurrence of ejection defects and is therefore excellent in storage stability and color developability, and has filed a patent application (Japanese Patent Application No. 2014-149870) relating to the ink composition.

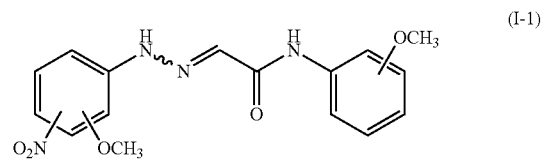

(I-1)

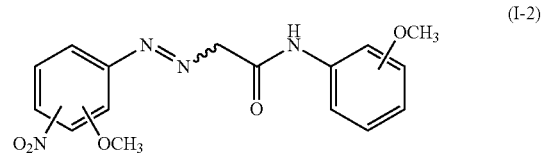

(I-2)

In the Japanese Patent Application No. 2014-149870, it is described that when reducing a content of the compound (I) in the ink composition to a specific concentration or lower in the presence of PY74, crystallization of the compound (I) is inhibited by the interaction with PY74 so that the resulting ink composition can be improved in storage stability and hardly suffers from occurrence of ejection defects.

The present invention relates to a process for producing a pigment composition in which a content of the compound (I) in a raw material pigment composition containing C.I. Pigment Yellow 74 and the compound (I) can be reduced, a method of reducing a content of the compound (1) in the raw material pigment composition, as well as a method of preventing an ink for ink jet printing from suffering from ejection defects.

The present inventors have found that by subjecting a raw material pigment composition containing C.I. Pigment Yellow 74 and the compound (I) to a treatment with an oxidizing agent, it is possible to effectively reduce a content of the compound (I) in the raw material pigment composition.

That is, the present invention relates to the following aspects [1] to [4].

[1] A process for producing a pigment composition, including the step of subjecting a raw material pigment composition containing C.I. Pigment Yellow 74 and a compound (I) represented by the below-mentioned formula (I-1) or (I-2) to a treatment with an oxidizing agent, in which a content of the compound (I) in the pigment composition after the treatment with the oxidizing agent on the basis of a content of the C.I. Pigment Yellow 74 in the pigment composition after the treatment with the oxidizing agent is not more than 1,200 mg/kg.

[2] A process for producing a pigment composition, including the step of subjecting a raw material pigment composition containing C.I. Pigment Yellow 74, a compound (I) represented by the aforementioned formula (I-1) or (I-2) and water to a treatment with hydrogen peroxide.

[3] A method of reducing a content of a compound (I) represented by the below-mentioned formula (I-1) or (I-2) in a raw material pigment composition containing C.I. Pigment Yellow 74 and the compound (I) represented by the aforementioned formula (I-1) or (I-2), said method including the step of subjecting the raw material pigment composition to a treatment with an oxidizing agent.

[4] A method of preventing an ink for ink-jet printing from suffering from ejection defects, including the step of compounding the pigment composition produced by the process according to the above aspect [1] or [2] in the ink for ink-jet printing.

According to the present invention, there are provided a process for producing a pigment composition in which a content of a compound (I) in a raw material pigment composition containing C.I. Pigment Yellow 74 and the compound (I) can be effectively reduced, a method of effectively reducing a content of the compound (I) in the raw material pigment composition, and a method of preventing an ink for ink-jet printing from suffering from ejection defects.

[Process for Producing Pigment Composition]

The process for producing a pigment composition according to the present invention is characterized in that the process includes the step of subjecting a raw material pigment composition containing PY74 and a compound (I) represented by the aforementioned formula (I-1) or (I-2) (hereinafter also referred to merely as a "raw material pigment composition") to a treatment with an oxidizing agent, in which a content of the compound (I) in the pigment composition after the treatment with the oxidizing agent on the basis of a content of the C.I. Pigment Yellow 74 in the pigment composition after the treatment with the oxidizing agent is not more than 1,200 mg/kg.

The compound (I) is a by-product produced in the production process of PY74. However, in accordance with the present invention, by subjecting the raw material pigment composition to a treatment with an oxidizing agent, it is possible to effectively reduce a content of the compound (I) in the raw material pigment composition without causing deterioration in properties of PY74 such as a particle size and a color tone of the pigment.

The compound (I) is in the form of a compound having a low solubility in a polar solvent similarly to PY 74. However, it has been found that in the case where both the compounds are dispersed in the polar solvent, the solubility of the compound (I) in the polar solvent is slightly higher than that of PY74. In consequence, it is supposed that in the production process of the present invention, by utilizing the slight difference in solubility in a polar solvent between the compound (I) and PY74 and subjecting the raw material pigment composition to a treatment with an oxidizing agent, it is possible to effectively reduce a content of the compound (I) in the raw material pigment composition without causing deterioration in properties of PY74 such as a particle size and a color tone of the pigment.

<C.I. Pigment Yellow 74>

The raw material pigment composition used in the present invention contains PY74. PY74 is a compound typically represented by the following formula (II).

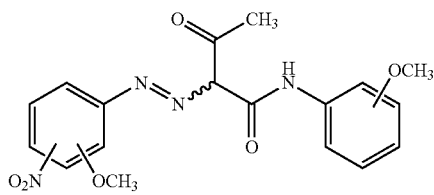

(II)

In the formula (II), the wavy line shows that a geometric isomer of a double bond adjacent thereto is at least one isomer selected from the group consisting of an E isomer and a Z isomer.

The compound represented by the formula (II) is preferably a compound represented by the following formula (II-1), i.e., 2-[(2-methoxy-4-nitrophenyl)azo]-N-(2-methoxyphenyl)-3-oxobutanamide.

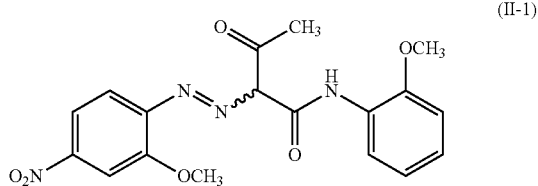 [SMILES: COc1cc([N+](=O)[O-])ccc1N=NC(C(C)=O)C(=O)Nc1ccccc1OC]

(II-1)

(Method of Producing PY74)

As the method of producing PY74, there may be mentioned, for example, a production method (A) of subjecting a diazotization product of nitro-o-anisidine to coupling reaction with acetoacetic-o-anisidide.

In the coupling reaction, the aforementioned compound (I) is produced as a by-product.

The production method (A) preferably includes the following steps (1) to (3).

Step (1): subjecting m-nitro-o-anisidine to diazotization reaction to thereby obtain a reaction product A.

Step (2): mixing acetoacetic-o-anisidide, sodium hydroxide and water, and then adding acetic acid to the resulting mixture, followed by further adding sodium acetate to the mixture, thereby obtaining a reaction product B.

Step (3): mixing the reaction product A obtained in the step (1) and the reaction product B obtained in the step (2), and subjecting the resulting mixture to coupling reaction.

The step (1) is the step of subjecting m-nitro-o-anisidine to diazotization reaction to thereby obtain the reaction product A. The diazotization reaction in the step (1) may be conducted, for example, by reacting m-nitro-o-anisidine with nitrous acid or a salt thereof under an acid condition.

The step (2) is the step of mixing acetoacetic-o-anisidide, sodium hydroxide and water and then adding acetic acid to the resulting mixture, followed by further adding sodium acetate to the mixture, to thereby obtain the reaction product B. In the step (2), by controlling amounts of acetic acid and sodium acetate used therein, it is possible to control an amount of the compound (I) by-produced to a certain extent. However, only the procedure of controlling amounts of the acetic acid and sodium acetate used is not enough to reduce the amount of the compound (I) by-produced to a sufficient extent.

The mass ratio of sodium acetate to acetic acid (sodium acetate/acetic acid) used in the step (2) is preferably not less than 87/13, more preferably not less than 88/12 and even more preferably not less than 90/10 from the viewpoint of suppressing by-production of the compound (I), and is also preferably not more than 99/1, more preferably not more than 98/2, even more preferably not more than 96/4 and further even more preferably not more than 95/5 from the viewpoint of enhancing productivity of the reaction product.

The step (3) is the step of mixing the reaction product A obtained in the step (1) and the reaction product B obtained in the step (2), and subjecting the resulting mixture to coupling reaction. In the step (3), it is preferred that the reaction product A obtained in the step (1) is added to the reaction product B obtained in the step (2).

The temperature used in the coupling reaction is preferably not lower than 0° C., and is also preferably not higher than 25° C., more preferably not higher than 20° C., even more preferably not higher than 15° C. and further even more preferably not higher than 10° C.

After completion of the coupling reaction in the step (3), the obtained reaction mixture may be subjected to additional treatments such as crystallization of the reaction product and treatments for controlling a shape, a size and the like of particles of the reaction product to desired ranges, if required.

<Compound (I)>

The raw material pigment composition used in the present invention contains the compound (I). The compound (I) is a compound represented by the following formula (I-1) or (I-2), and is by-produced during the production process of PY74. The compound (I) is also a compound capable of satisfying such a condition that a ratio of an ion mass (m) to an ionic charge (z) (m/z) in a mass spectrum (ionization mode: positive) in mass spectrometry thereof is 345. The compound represented by the following formula (I-1) and the compound represented by the following formula (I-2) have a tautomeric relationship with each other.

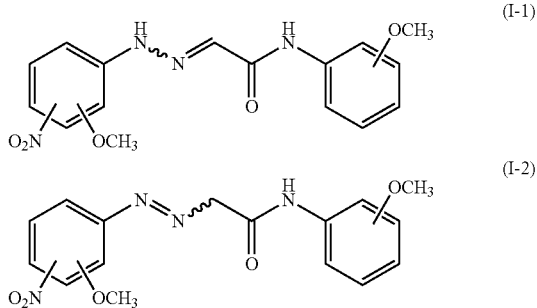

In the formulae (I-1) and (I-2), the wavy line indicates that a geometric isomer of a double bond adjacent thereto is at least one isomer selected from the group consisting of an E isomer and a Z isomer.

The compound represented by the formula (I-1) is preferably a compound represented by the following formula (I-1-1), and the compound represented by the formula (I-2) is preferably a compound represented by the following formula (I-2-1), i.e., 2-[(2-methoxy-4-nitrophenyl)azo]-N-(2-methoxyphenyl)ethanamide.

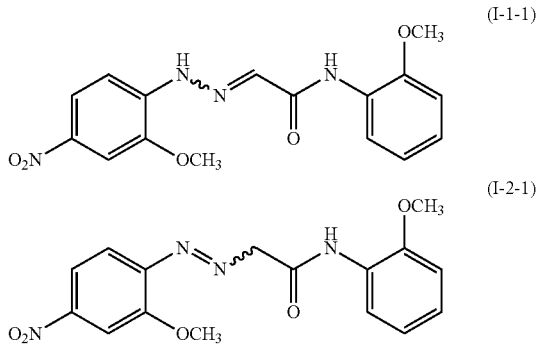

<Water>

The raw material pigment composition used the present invention may contain water.

Examples of the water used in the present invention include tap water, ion-exchanged water, distilled water, etc. From the viewpoint of maintaining good stability of the oxidizing agent upon the treatment, preferred are ion-exchanged water and distilled water, and more preferred is ion-exchanged water.

<Raw Material Pigment Composition>

As the raw material pigment composition used in the production process of the present invention, there may be mentioned a raw material pigment composition (i) containing PY74 obtained by the aforementioned production method (A), etc., and water, a raw material pigment composition (ii) obtained by mixing commercially available PY74 with water by conventionally known methods, a raw material pigment composition (iii) prepared by dispersing commercially available PY74 in water using a polymer dispersant, and the like.

(Raw Material Pigment Composition (iii))

The raw material pigment composition (iii) is preferably obtained by mixing PY74, a polymer dispersant and water with each other and then subjecting the resulting mixture to dispersion treatment using a disperser from the viewpoint of improving productivity of the pigment composition.

The raw material pigment composition (iii) may contain not only the aforementioned polymer dispersant, but also an organic solvent, a surfactant, a pH controller and various other additives, if required.

Examples of the polymer dispersant include synthetic polymers, natural polymers and derivatives of these polymers. Among these polymer dispersants, from the viewpoint of improving storage stability of the resulting ink composition and preventing occurrence of ejection defects when compounding the pigment composition in an ink for ink jet printing, etc., preferred are synthetic polymers.

From the viewpoint of improving storage stability of the resulting ink composition and preventing occurrence of ejection defects, the synthetic polymers are preferably in the form of a copolymer containing a constitutional unit derived from a hydrophobic group-containing monomer and a constitutional unit derived from a hydrophilic group-containing monomer. Examples of the hydrophobic group-containing monomer include aromatic vinyl monomers such as styrene, (meth)acrylate monomers such as benzyl methacrylate, and hydrophobic monomers such as styrene macromers. Examples of the hydrophilic group-containing monomer include alkoxy polyalkylene glycol (meth)acrylates such as methoxy polyethylene glycol (1 to 30) methacrylate. Examples of the other monomers that may be copolymerized with the aforementioned monomers include carboxylic acid monomers such as acrylic acid and methacrylic acid. The term "(meth)acrylate" as used herein means an acrylate and/or a methacrylate.

The content of the constitutional unit derived from the hydrophobic group-containing monomer in the aforementioned copolymer is preferably not less than 40% by mass, more preferably not less than 45% by mass and even more preferably not less than 50% by mass, and is also preferably not more than 70% by mass, more preferably not more than 65% by mass and even more preferably not more than 60% by mass, from the viewpoint of improving dispersibility of the pigment in the resulting pigment composition.

The content of the constitutional unit derived from the hydrophilic group-containing monomer in the aforementioned copolymer is preferably not less than 15% by mass, more preferably not less than 20% by mass and even more preferably not less than 25% by mass, and is also preferably not more than 45% by mass, more preferably not more than 40% by mass and even more preferably not more than 35% by mass.

In the case where the aforementioned copolymer further contains the constitutional unit derived from the carboxylic acid monomer, the content of the constitutional unit derived from the carboxylic acid monomer in the copolymer is preferably not less than 5% by mass, more preferably not less than 7% by mass and even more preferably not less than 10% by mass, and is also preferably not more than 30% by mass, more preferably not more than 25% by mass and even more preferably not more than 20% by mass.

The weight-average molecular weight of the polymer dispersant is preferably not less than 1,000, more preferably not less than 5,000, even more preferably not less than 10,000 and further even more preferably not less than 30,000, and is also preferably not more than 200,000, more preferably not more than 100,000 and even more preferably not more than 80,000, from the viewpoint of enhancing absorptivity of the polymer dispersant to the pigment. The weight-average molecular weight of the polymer dispersant may be measured by the method described in Examples below.

The commercially available products of the aforementioned synthetic polymers are preferably at least one compound selected from the group consisting of a styrene-acrylic acid copolymer and a styrene-methacrylic acid copolymer from the viewpoint of improving storage stability of the resulting ink composition and preventing occurrence of ejection defects. Specific examples of the commercially available products of the synthetic polymers include "JONCRYL" series products available from BASF Japan, Ltd., such as "JONCRYL 67", "JONCRYL 68", "JONCRYL 678", "JONCRYL 680", "JONCRYL 682", "JONCRYL 683", "JONCRYL 690", "JONCRYL 819", etc.

The organic solvent is preferably incorporated in the raw material pigment composition from the viewpoint of reducing the content of the compound (I) in the resulting pigment composition. Examples of the aforementioned organic solvent include monohydric alcohols, polyhydric alcohols, polyhydric alcohol alkyl ethers, polyhydric alcohol alkyl ether acetates and nitrogen-containing heterocyclic compounds. Specific examples of the preferred organic solvents include polyhydric alcohols such as glycerin, and polyhydric alcohol alkyl ethers such as ethylene glycol isopropyl ether.

In addition, from the viewpoint of improving operating properties upon removal of the organic solvent in the additional treatments, as the organic solvents, preferred are ketone-based solvents, more preferred are methyl ethyl ketone and methyl isobutyl ketone, and even more preferred is methyl ethyl ketone. These organic solvents may be used alone or in the form of a mixture of any two or more thereof.

Examples of the surfactant include at least one surfactant selected from the group consisting of a nonionic surfactant such as an organosiloxane-based surfactant and acetylene glycol, and an anionic surfactant such as a phosphoric acid ester-based surfactant.

Examples of the pH controller include amines such as diethanolamine, triethanolamine, propanolamine and morpholine, inorganic salts such as potassium hydroxide and sodium hydroxide, hydroxides such as ammonium hydroxide, e.g., quaternary ammonium hydroxide, carbonates, phosphates, etc. The aforementioned organic solvents and additives may be respectively used alone or in combination of any two or more thereof.

(Components of Raw Material Pigment Composition)

The total content of PY74 and the compound (I) in the raw material pigment composition (hereinafter also referred to merely as a "raw material pigment content") is preferably not less than 0.1% by mass, more preferably not less than 0.3% by mass, even more preferably not less than 0.5% by mass, further even more preferably not less than 1% by mass, still further even more preferably not less than 2% by mass, still further even more preferably not less than 3% by mass, still further even more preferably not less than 5% by mass, still further even more preferably not less than 8% by mass, still further even more preferably not less than 10% by mass and still further even more preferably not less than 15% by mass from the viewpoint of enhancing productivity of the pigment composition, and is also preferably not more than 30% by mass and more preferably not more than 25% by mass from the viewpoint of preventing deterioration in productivity of the pigment composition owing to increased viscosity of the composition.

In the case of using any of the raw material pigment compositions (i) and (ii), the raw material pigment content is preferably not less than 0.1% by mass, more preferably not less than 0.3% by mass, even more preferably not less than 0.5% by mass, further even more preferably not less than 1% by mass and still further even more preferably not less than 2% by mass from the viewpoint of facilitating production of the pigment and enhancing productivity of the pigment composition, and is also preferably not more than 10% by mass, more preferably not more than 5% by mass and even more preferably not more than 3% by mass from the viewpoint of enhancing productivity upon production of the pigment.

In the case of using the raw material pigment composition the raw material pigment content is preferably not less than 1% by mass, more preferably not less than 2% by mass, even more preferably not less than 5% by mass and further even more preferably not less than 8% by mass from the viewpoint of enhancing productivity of the pigment composition, and is also preferably not more than 30% by mass, more preferably not more than 25% by mass and even more preferably not more than 20% by mass from the viewpoint of preventing deterioration in productivity of the pigment composition owing to increased viscosity of the composition.

The content of water in the raw material pigment composition is preferably not less than 50% by mass, more preferably not less than 60% by mass and even more preferably not less than 65% by mass from the viewpoint of improving storage stability of the resulting ink composition, and is also preferably not more than 99% by mass, more preferably not more than 97% by mass, even more preferably not more than 95% by mass and further even more preferably not more than 90% by mass from the viewpoint of improving productivity of the pigment composition.

In the case of using the raw material pigment composition the content of the polymer dispersant in the raw material pigment composition is preferably not less than 1% by mass, more preferably not less than 2% by mass and even more preferably not less than 3% by mass from the viewpoint of reducing the content of the compound (I) in the resulting pigment composition as well as from the viewpoint of improving storage stability of the resulting ink composition when compounding the pigment composition in an ink for ink-jet printing, etc., and is also preferably not more than 10% by mass, more preferably not more than 8% by mass and even more preferably not more than 7% by mass from the viewpoint of improving optical density of the resulting ink composition upon printing.

The content of the organic solvent that may be optionally used according to the requirements in the raw material pigment composition is preferably not less than 0.5% by mass, more preferably not less than 1.5% by mass, even more preferably not less than 3% by mass and further even more preferably not less than 8% by mass from the viewpoint of reducing the content of the compound (I) in the resulting pigment composition as well as from the viewpoint of improving storage stability of the resulting ink composition, and is also preferably not more than 40% by mass, more preferably not more than 30% by mass, even more preferably not more than 25% by mass and further even more preferably not more than 18% by mass from the viewpoint of improving optical density of the resulting ink composition upon printing.

The content of the surfactant that may be optionally used according to the requirements in the raw material pigment composition is preferably not less than 0.1% by mass, more preferably not less than 0.3% by mass and even more preferably not less than 0.5% by mass from the viewpoint of improving storage stability of the resulting ink composition, and is also preferably not more than 10% by mass, more preferably not more than 5% by mass and even more preferably not more than 3% by mass from the viewpoint of improving optical density of the resulting ink composition upon printing.

In the case of using the raw material pigment composition the content of water in the raw material pigment composition is preferably not less than 50% by mass, more preferably not less than 60% by mass and even more preferably not less than 65% by mass from the viewpoint of improving storage stability of the resulting ink composition, and is also preferably not more than 99% by mass, more preferably not more than 90% by mass and even more preferably not more than 80% by mass from the viewpoint of improving optical density of the resulting ink composition upon printing.

<Treatment with Oxidizing Agent>

In the process for producing the pigment composition according to the present invention, the raw material pigment composition containing PY74 and the compound (I) represented by the aforementioned formula (I-1) or (I-2) is subjected to a treatment with an oxidizing agent.

The treatment with the oxidizing agent may be carried out by adding the oxidizing agent to the raw material pigment composition. In this case, the oxidizing agent added may be used in the form of an aqueous solution thereof.

As the oxidizing agent, from the viewpoint of effectively reducing the content of the compound (I) in the raw material pigment composition, there may be used peroxides, oxygen acids or salts thereof, peroxo acids or salts thereof, metal salts, permanganic acid or salts thereof, chromic acid or salts thereof, nitrates, sulfates and the like. Among these oxidizing agents, preferred is at least one compound selected from the group consisting of peroxides, oxygen acids or salts thereof, peroxo acids or salts thereof and metal salts.

As the peroxide, there may be used hydrogen peroxide.

Examples of the oxygen acids or salts thereof include hypochlorous acid, hypobromous acid, hypoiodous acid, chloric acid, bromic acid, iodic acid and alkali metal salts or alkali earth metal salts of hypochlorous acid.

Examples of the peroxo acids or salts thereof include peracetic acid, perbenzoic acid, perphthalic acid and salts of these acids.

Examples of the metal salts include iron (III) chloride, iron (III) sulfate, iron (III) nitrate, iron (III) citrate and iron (III) ammonium sulfate.

Among the aforementioned oxidizing agents, preferred are the persulfates and the oxygen acids or salts thereof, more preferred are hydrogen peroxide and the hypochlorous acid alkali metal salts, even more preferred is at least one compound selected from the group consisting of hydrogen peroxide, sodium hypochlorite, potassium hypochlorite and lithium hypochlorite, and from the viewpoint of achieving high cost efficiency, further even more preferred is at least one compound selected from the group consisting of hydrogen peroxide and sodium hypochlorite.

(Treatment with Hydrogen Peroxide)

The treatment with hydrogen peroxide is carried out by adding hydrogen peroxide to the raw material pigment composition. The hydrogen peroxide may be added in the form of an aqueous solution thereof or in the form of a solid such as an inorganic peroxide which is capable of generating hydrogen peroxide when dissolved in water.

In the case where the pigment composition treated with hydrogen peroxide is directly used as such in an ink for inkjet printing, etc., from the viewpoint of enhancing the degree of freedom of formulation thereof without incorporating unnecessary inorganic ions thereinto, a hydrogen peroxide aqueous solution, i.e., hydrogen peroxide water, is preferably added.

In addition, from the viewpoint of enhancing productivity of the pigment composition, it is also preferred that hydrogen peroxide water and sodium carbonate are respectively added to the raw material pigment composition, or it is further preferred that the solid inorganic peroxide is added thereto. The solid inorganic peroxide is preferably at least one compound selected from the group consisting of percarbonates and perborates of alkali metals, more preferably at least one compound selected from the group consisting of sodium percarbonate and sodium perborate, and even more preferably sodium percarbonate.

Meanwhile, in the present specification, the "sodium percarbonate" means an addition compound of sodium carbonate and hydrogen peroxide which is represented by the chemical formula of $2Na_2CO_3 \cdot 3H_2O_2$, whereas the "sodium perborate" means an addition compound of sodium borate and hydrogen peroxide which is represented by the chemical formula of $NaBO_2 \cdot H_2O_2 \cdot 3H_2O$.

In the following, the treatment with the oxidizing agent is mainly explained with respect to the treatment with hydrogen peroxide. However, the conditions of treatments with the other oxidizing agents such as treatments with the hypochlorous acid alkali metal salts, such as the mass ratio (mass ratio of an amount of the oxidizing agent added to the raw material pigment content), concentration of the oxidizing agent, temperature, pressure, time, pH value, stirring conditions, particle size of the pigment, addition method, additives, organic solvents, etc., are basically the same as those used in the treatment with hydrogen peroxide, unless otherwise specified. Therefore, although the detailed explanation of the individual conditions of the treatments with the other oxidizing agents such as the treatments with the hypochlorous acid alkali metal salts is omitted herein to avoid overlapping of the descriptions, it should be noted that the same conditions as described in the treatment with hydrogen peroxide are applied to the treatments with the other oxidizing agents.

In the present invention, from the viewpoint of inhibiting discoloration of PY74, the treatment with hydrogen peroxide is preferably carried out under the conditions capable of suppressing increase in pH value within the reaction system. With respect to the conditions of the treatment with hydrogen peroxide, from the viewpoint of promoting the decomposition reaction of the compound (I), it is preferred that at least one material selected from the group consisting of a metal catalyst, a catalase, sodium hydroxide, an organic peracid, a peracid precursor and a hydrogencarbonate ion is allowed to be present within the reaction system upon the treatment, and it is more preferred that a hydrogencarbonate ion is allowed to be present within the reaction system upon the treatment. Among these treatment conditions, from the viewpoint of inhibiting discoloration of the pigment, the hydrogencarbonate ion is more preferably included in the reaction system upon the treatment. As the method of allowing the hydrogencarbonate ion to be present within the reaction system upon the treatment, there is preferably used a method of adding sodium percarbonate to the reaction system or a method of adding a hydrogen peroxide aqueous solution and sodium carbonate to the reaction system.

The mass ratio of an amount of the hydrogen peroxide added to a total content of PY74 and the compound (I) (raw material pigment content) in the raw material pigment composition (amount of hydrogen peroxide added/raw material pigment content) is preferably not less than 0.001, more preferably not less than 0.005, even more preferably not less than 0.01, further even more preferably not less than 0.012 and still further even more preferably not less than 0.015 from the viewpoint of promoting decomposition of the compound (1), and in some cases, the aforementioned mass ratio may be not less than 0.05, for example, not less than 0.1, not less than 0.3 or not less than 0.5. Also, from the viewpoint of inhibiting discoloration of PY74, the mass ratio of the amount of the hydrogen peroxide added to the total content of PY74 and the compound (I) is preferably not more than 10, more preferably not more than 5, even more preferably not more than 3, further even more preferably not more than 2 and still further even more preferably not more than 1.3. In addition, when using the raw material pigment composition in the case where the pigment composition subjected to the treatment with hydrogen peroxide is directly used in an ink for inkjet printing, etc., the mass ratio of the amount of the hydrogen peroxide added to the total content of PY74 and the compound (I) (raw material pigment content) in the raw material pigment composition (iii) (amount of hydrogen peroxide added/raw material pigment content) is furthermore preferably not more than 0.8, even furthermore preferably not more than 0.1 and still even furthermore preferably not more than 0.05 from the viewpoint of reducing a residual amount of the hydrogen peroxide in the resulting pigment composition.

When the hydrogen peroxide is used in the form of a hydrogen peroxide aqueous solution, the concentration of the hydrogen peroxide in the hydrogen peroxide aqueous solution is preferably not less than 3% by mass, more preferably not less than 10% by mass and even more preferably not less than 20% by mass from the viewpoint of promoting decomposition of the compound (I), and is also preferably not more than 60% by mass, more preferably not more than 50% by mass and even more preferably not more than 40% by mass from the viewpoint of inhibiting discoloration of PY74.

The concentration of the hydrogen peroxide in the reaction system upon the treatment with hydrogen peroxide is preferably not less than 0.001% by mass, more preferably not less than 0.01% by mass, even more preferably not less than 0.02% by mass, further even more preferably not less than 0.03% by mass and still further even more preferably not less than 0.04% by mass from the viewpoint of promoting decomposition of the compound (I). In some cases, the concentration of the hydrogen peroxide in the reaction system may be not less than 0.1% by mass, for example, not less than 2% by mass. Also, from the viewpoint of inhibiting discoloration of PY74, the concentration of the hydrogen peroxide in the reaction system upon the treatment with hydrogen peroxide is preferably not more than 30% by mass, more preferably not more than 10% by mass and even more preferably not more than 5% by mass. In addition, in the case where the pigment composition subjected to the treatment with hydrogen peroxide is directly used in an ink for ink-jet printing, etc., the concentration of the hydrogen peroxide in the reaction system upon the treatment with hydrogen peroxide is furthermore preferably not more than 2.5% by mass, even furthermore preferably not more than 1% by mass and still even furthermore preferably not more than 0.5% by mass from the viewpoint of reducing a residual amount of the hydrogen peroxide in the resulting pigment composition.

The temperature upon the treatment with hydrogen peroxide is preferably not lower than 20° C., more preferably not lower than 40° C., even more preferably not lower than 50° C., further even more preferably not lower than 60° C. and still further even more preferably not lower than 70° C. from the viewpoint of promoting decomposition of the compound (I), and is also preferably not higher than 95° C., more preferably not higher than 93° C. and even more preferably not higher than 91° C. from the viewpoint of inhibiting discoloration of PY74, and in some cases, the aforementioned temperature upon the treatment with hydrogen peroxide may be not higher than 90° C., for example, not higher than 85° C.

The time of the treatment with hydrogen peroxide is preferably not less than 5 minutes, more preferably not less than 10 minutes, even more preferably not less than 20 minutes, further even more preferably not less than 30 minutes, still further even more preferably not less than 40 minutes and still further even more preferably not less than 50 minutes from the viewpoint of reducing a content of the compound (I) in the resulting pigment composition, and is also preferably not more than 10 hours, more preferably not more than 8 hours, even more preferably not more than 5 hours, further even more preferably not more than 3 hours and still further even more preferably not more than 2 hours from the viewpoint of enhancing productivity of the pigment composition as well as from the viewpoint of inhibiting discoloration of PY74.

The pH value within the reaction system upon the treatment with hydrogen peroxide is preferably not less than 3, more preferably not less than 4, even more preferably not less than 5, further even more preferably not less than 7, still further even more preferably not less than 8, still further even more preferably not less than 9 and still further even more preferably not less than 10 from the viewpoint of promoting decomposition of the compound (I), i.e., from the viewpoint of enhancing productivity of the pigment composition, and is also preferably not more than 13, more preferably not more than 12, even more preferably not more than 9, further even more preferably not more than 8 and still further even more preferably not more than 7 from the viewpoint of inhibiting discoloration of PY74. In addition, in the case where the treatment with hydrogen peroxide is conducted in a stainless steel reaction vessel, from the viewpoint of inhibiting corrosion of stainless steel, the pH value within the reaction system upon the treatment with hydrogen peroxide is preferably not less than 5, more preferably not less than 6, even more preferably not less than 7 and further even more preferably not less than 8. From the viewpoint of enhancing productivity of the pigment composition, the pH value within the reaction system upon the treatment with hydrogen peroxide is preferably not less than 8 and not more than 13, more preferably not less than 9 and not more than 12, and even more preferably not less than 10 and not more than 12. Also, from the viewpoint of producing the pigment composition while attaching much importance to the point of inhibiting discoloration of PY74, the pH value within the reaction system upon the treatment with hydrogen peroxide is preferably not less than 3 and not more than 9, more preferably not less than 4 and not more than 8, and even more preferably not less than 5 and not more than 7.

The pH value within the reaction system upon the treatment with a hypochlorous acid alkali metal salt, in particular, upon the treatment with sodium hypochlorite, is preferably not less than 7, more preferably not less than 8 and even more preferably not less than 9 from the viewpoint of promoting decomposition of the compound (I), i.e., from the viewpoint of enhancing productivity of the pigment composition, and is also preferably not more than 12 and more preferably not more than 11 from the viewpoint of inhibiting discoloration of PY74. Furthermore, from the viewpoint of enhancing productivity of the pigment composition and inhibiting discoloration of PY74, the pH value within the reaction system upon the treatment with sodium hypochlorite is preferably not less than 7 and not more than 12, more preferably not less than 8 and not more than 11, and even more preferably not less than 9 and not more than 11.

The stirring operation during the treatment with hydrogen peroxide is preferably conducted using a high-speed rotary crusher from the viewpoint of deaggregating the pigment in the form of aggregated particles to increase a specific surface area of the pigment and thereby promote decomposition of the compound (I).

The peripheral speed of a tip end of a stirring blade of the high-speed rotary crusher is preferably not less than 0.3 m/s, more preferably not less than 1.0 m/s, even more preferably not less than 5.0 m/s and further even more preferably not less than 10 m/s. Also, from the viewpoint of suppressing foaming of the reaction solution during the stirring operation, the peripheral speed of a tip end of a stirring blade of the high-speed rotary crusher is preferably not more than 100 m/s, more preferably not more than 75 m/s, even more preferably not more than 60 m/s and further even more preferably not more than 50 m/s.

In addition, the shear rate of the stirring blade is preferably not less than 10 $S^{-1}$, more preferably not less than 100 $S^{-1}$, even more preferably not less than 200 $S^{-1}$, further even more preferably not less than 1000 $S^{-1}$ and still further even more preferably not less than 10000 $S^{-1}$. Also, from the viewpoint of suppressing foaming of the reaction solution during the stirring operation, the shear rate of the stirring blade is preferably not more than 100000 $S^{-1}$, more preferably not more than 75000 $S^{-1}$, even more preferably not more than 60000 $S^{-1}$ and further even more preferably not more than 50000 $S^{-1}$.

From the viewpoint of deaggregating the pigment in the form of aggregated particles to increase a specific surface area of the pigment and thereby promote decomposition of the compound (I), the particle size of the pigment during the treatment with hydrogen peroxide is preferably small. The suitable particle size of the pigment during the treatment with hydrogen peroxide is preferably in the range of not more than 30 μm, more preferably not more than 20 even more preferably not more than 15 μm and further even more preferably not more than 10 μm.

As the stirring apparatus, there may be used any suitable conventionally known stirring apparatuses. Examples of the stirring apparatus include media-less stirrers such as "ULTRA-TRURRAX" available from IKA, "T.K. HOMO MIXER", "T.K. PIPELINE HOMO MIXER" and "T.K. FILMIX" all available from PRIMIX Corporation, "CLEARMIX" available from M Technique Co., Ltd., and "CAVITRON" available from EUROTEC Co., Ltd.; media stirrers such as "VISCOMILL" available from AIMEX Co., Ltd., "Ultra Apex Mill" available from Kotobuki Industries Co., Ltd., "STAR MILL" available from Ashizawa Finetech Ltd., "MicroMedia" available from Buhler Corporation, and "SPIKE MILL" available from INOUE MFG. Inc.; and high-pressure impact type dispersers such as "MICROFLU-IDIZER" available from Microfluidics Corporation, "Ultimizer" available from Sugino Machine Ltd., "Nanomizer" available from Yoshida Kikai Seisakusho Co., Ltd., and "NANO3000" available from Beryu Corporation. In addition, an ultrasonic disperser may also be preferably used in the present invention.

The method of adding the hydrogen peroxide is not particularly limited, and from the viewpoint of promoting decomposition of the compound (I), there is preferably used a method of adding the hydrogen peroxide in a split addition manner.

The pressure of the reaction system upon the treatment with hydrogen peroxide is not particularly limited, and the treatment with hydrogen peroxide may be conducted under a pressure near to normal pressures.

The production process of the present invention preferably further includes the step of subjecting the pigment composition obtained after the treatment with hydrogen peroxide to filtration and water-washing for the purpose of removing unreacted hydrogen peroxide from the pigment composition.

Furthermore, the production process of the present invention may further include the step of removing the hydrogen peroxide from the obtained pigment composition by adding an alkali gent to the pigment composition or subjecting the pigment composition to heating treatment.

In the present invention, from the viewpoint of maintaining good stability of the hydrogen peroxide upon the treatment with hydrogen peroxide, a heavy metal scavenger may be further added to the reaction system. The heavy metal scavenger added is preferably at least one compound selected from the group consisting of the following compounds (1) to (7).

(1) Phosphoric acid salts such as orthophosphoric acid salts, pyrophosphoric acid salts, tripolyphosphoric acid salts, metaphosphoric acid salts, hexametaphosphoric acid salts and phytic acid salts.

(2) Salts of phosphonic acids such as ethane-1,1-diphosphonic acid, ethane-1,1,2-triphosphonic acid, ethane-1-hydroxy-1,1-diphosphonic acid and derivatives thereof, ethanehydroxy-1,1,2-triphosphonic acid, ethane-1,2-dicarboxy-1,2-diphosphonic acid and methanehydroxyphosphonic acid.

(3) Salts of phosphonocarboxylic acids such as 2-phosphonobutane-1,2-dicarboxylic acid, 1-phosphonobutane-2,3,4-tricarboxylic acid and α-methylphosphonosuccinic acid.

(4) Salts of amino acids such as aspartic acid, glutamic acid and glycine.

(5) Aminopolyacetic acid salts such as nitrilotriacetic acid salts, iminodiacetic acid salts, ethylenediaminetetraacetic acid salts, diethylenetriaminepentaacetic acid salts, glycoletherdiaminetetraacetic acid salts, hydroxyethyliminodiacetic acid salts, triethylenetetraminehexaacetic acid salts and djenkolic acid salts.

(6) Polymer electrolytes such as polyacrylic acid, acrylic acid/maleic acid copolymers, polyfumaric acid, polymaleic acid, poly-α-hydroxyacrylic acid, polyacetalcarboxylic acid or salts of these compounds.

(7) Salts of organic carboxylic acids such as diglycolic acid, oxydisuccinic acid, carboxymethyloxysuccinic acid, citric acid, lactic acid, tartaric acid, oxalic acid, malic acid, gluconic acid, carboxymethyltartaric acid and carboxymethylsuccinic acid.

Among these heavy metal scavengers, preferred is at least one compound selected from the group consisting of the phosphonic acid salts (2), the aminopolyacetic acid salts (5) and the organic carboxylic acid salts (7), more preferred are the aminopolyacetic acid salts (5), and even more preferred are diethylenetriaminepentaacetic acid salts.

In the present invention, from the viewpoint of enhancing the effect of reducing the content of the compound (I) by the treatment with hydrogen peroxide, it is preferred that an ascorbic acid salt is further added to the reaction system. The ascorbic acid salt is preferably an ascorbic acid alkali metal salt, more preferably at least one compound selected from the group consisting of sodium ascorbate and potassium ascorbate, and even more preferably sodium ascorbate.

The amount of the ascorbic acid salt added as measured in terms of a mass ratio of the amount of the ascorbic acid salt added to the amount of the hydrogen peroxide added (amount of ascorbic acid salt added/amount of hydrogen peroxide added) is preferably not less than 0.01, more preferably not less than 0.05, even more preferably not less than 0.1, further even more more preferably not less than 0.3 and still further even more preferably not less than 0.5, and is also preferably not more than 3, more preferably not more than 2.5, even more preferably not more than 2, further even more preferably not more than 1.5 and still further even more preferably not more than 1, from the viewpoint of enhancing the effect of reducing the content of the compound (I) by the treatment with hydrogen peroxide.

In addition, when using the raw material pigment composition in the case where an organic solvent is incorporated in the raw material pigment composition, the organic solvent may be removed from the resulting pigment composition from the viewpoint of enhancing the degree of freedom of formulation thereof, for example, when used in an ink for ink-jet printing.

As the method of removing the organic solvent, there may be used, for example, a method of distilling off the organic solvent under heating or under reduced pressure, or a method of subjecting the pigment composition to filtration, etc. Among these methods, from the viewpoint of enhancing productivity of the pigment composition, preferred is the method of distilling off the organic solvent under heating or under reduced pressure. The heating temperature used in the aforementioned method may vary depending upon the kind of organic solvent to be removed, and is preferably not lower than 35° C., more preferably not lower than 45° C. and even more preferably not lower than 55° C. from the viewpoint of enhancing productivity of the pigment composition, and is also preferably not higher than 85° C., more preferably not higher than 75° C. and even more preferably not higher than 65° C. from the viewpoint of suppressing thermal decomposition of the pigment composition, etc. The organic solvent is preferably substantially completely removed from the resulting pigment composition. However, the residual organic solvent may be present in the pigment composition unless the objects and advantageous effects of the present invention are adversely affected by the residual organic solvent. The content of the residual organic solvent in the pigment composition is preferably not more than 0.1% by mass and more preferably not more than 0.01% by mass.

In addition, after removing the organic solvent, water may be added to the pigment composition, if required, to adjust a solid content of the pigment composition to a desired value. The solid content of the pigment composition after removing the organic solvent therefrom is preferably not less than 10% by mass, more preferably not less than 12% by mass and even more preferably not less than 15% by mass, and is also preferably not more than 40% by mass and more preferably not more than 35% by mass.

(Components of Pigment Composition)

With respect to the pigment composition obtained according to the production process of the present invention, by subjecting the raw material pigment composition to the aforementioned treatment with the oxidizing agent, in particular, the treatment with hydrogen peroxide or the treatment with the hypochlorous acid alkali metal salt, it is possible to reduce a content of the compound (1) in the pigment composition obtained after such a treatment. The pigment composition obtained by the production process contains PY74, the compound (I) and water. From the viewpoint of improving storage stability of the ink composition and preventing occurrence of ejection defects when compounding the pigment composition in an ink for ink-jet printing, etc., the content of the compound (I) in the pigment composition after the treatment as measured in terms of a residual rate of the compound (I) in the pigment composition on the basis of the content of the compound (I) in the raw material pigment composition before the treatment, is preferably not more than 80%, more preferably not more than 75%, even more preferably not more than 70%, further even more preferably not more than 65%, still further even more preferably not more than 60%, still further even more preferably not more than 55% and still further even more preferably not more than 50%. Also, from the viewpoint of enhancing productivity of the pigment composition, the content of the compound (I) in the pigment composition after the treatment as measured in terms of a residual rate of the compound (I) in the pigment composition on the basis of the content of the compound (I) in the raw material pigment composition before the treatment, is preferably not less than 5%, more preferably not less than 10%, even more preferably not less than 15%, further even more preferably not less than 18% and still further even more preferably not less than 20%.

Furthermore, when using the raw material pigment composition (iii), from the viewpoint of improving storage stability of the ink composition and preventing occurrence of ejection defects, the content of the compound (I) in the pigment composition after the treatment as measured in terms of a residual rate of the compound (I) in the pigment composition on the basis of the content of the compound (I) in the raw material pigment composition before the treatment is preferably not more than 50%, more preferably not more than 30%, even more preferably not more than 18%, further even more preferably not more than 12%, still further even more preferably not more than 8% and still further even more preferably not more than 5%.

Meanwhile, in the case where the temperature used upon the treatment with hydrogen peroxide is not lower than 20° C. and not higher than 95° C., the content of compound (I) in the pigment composition obtained after subjecting the raw material pigment composition to thermal treatment by using no hydrogen peroxide is the same as the content of the compound (I) in the raw material pigment composition before the treatment. For this reason, upon calculating the aforementioned residual rate of the compound (I) in the pigment composition, the value of the content of compound (I) in the pigment composition obtained after subjecting the raw material pigment composition to thermal treatment by using no hydrogen peroxide may be used in place of the value of the content of the compound (I) in the raw material pigment composition before the treatment. The contents of the compound (I) in the raw material pigment composition and the pigment composition after the treatment may be measured by the method described in Examples below.

From the viewpoint of improving storage stability of the resulting ink composition and preventing occurrence of ejection defects when compounding the pigment composition in an ink for ink-jet printing, etc., the content of the compound (I) in the pigment composition after the treatment with hydrogen peroxide on the basis of the content of PY74 in the pigment composition after the treatment with hydrogen peroxide is preferably not more than 1,200 mg/kg, more preferably not more than 1,100 mg/kg, even more preferably not more than 1,000 mg/kg, further even more preferably not more than 850 mg/kg, still further even more preferably not more than 750 mg/kg and still further even more preferably not more than 650 mg/kg. Also, from the viewpoint of enhancing productivity of the pigment composition, the content of the compound (I) in the pigment composition after the treatment with hydrogen peroxide on the basis of the content of PY74 in the pigment composition after the treatment with hydrogen peroxide is preferably not less than 80 mg/kg, more preferably not less than 100 mg/kg, even more more preferably not less than 130 mg/kg, further even more preferably not less than 150 mg/kg and still further even more preferably not less than 180 mg/kg. The content of the compound (I) in the pigment composition after the treatment with hydrogen peroxide on the basis of the content of PY74 in the pigment composition after the treatment with hydrogen peroxide may be measured by the method described in Examples below.

In addition, the content of C.I. Pigment Yellow 74 in the pigment composition after the treatment as measured in terms of a residual rate of C.I. Pigment Yellow 74 in the pigment composition on the basis of the content of C.I. Pigment Yellow 74 in the raw material pigment composition before the treatment is preferably not less than 80%, more preferably not less than 90%, even more preferably not less than 95%, further even more preferably not less than 98%, still further even more preferably not less than 99% and most preferably 100% from the viewpoint of avoiding deterioration in properties of the pigment such as color tone thereof.

The total content of PY74 and the compound (I) in the pigment composition after the treatment is preferably not less than 0.1% by mass, more preferably not less than 0.3% by mass, even more preferably not less than 0.5% by mass, further even more preferably not less than 1% by mass, still further even more preferably not less than 2% by mass, still further even more preferably not less than 3% by mass, still further even more preferably not less than 5% by mass, still further even more preferably not less than 8% by mass, still further even more preferably not less than 10% by mass and still further even more preferably not less than 15% by mass from the viewpoint of enhancing productivity of the pigment composition, and is also preferably not more than 30% by mass and more preferably not more than 25% by mass from the viewpoint of preventing deterioration in productivity of the pigment composition.

<Preferred Range of Color Difference>

From the viewpoint of improving color developability of the pigment, the degree of discoloration of the pigment in the pigment composition owing to the treatment with hydrogen peroxide is preferably smaller. The color difference $\Delta E^*$ of the pigment in the form of particles in $L^*$, $a^*$, $b^*$ color specification system between before and after the treatment with hydrogen peroxide as shown in Examples is preferably less than 6.0, more preferably less than 4.5, even more preferably less than 3.2 and further even more preferably less than 2.8.

When using the raw material pigment composition the pigment composition after the treatment contains not only PY74, the residual compound (1) and water, but also the polymer dispersant, if required, together with an organic solvent, a surfactant, a pH controller and various other additives, and is obtained in the form of an aqueous pigment dispersion formed by dispersing PY74 as the pigment in an aqueous medium containing water as a main component.

The content of the polymer dispersant in the pigment composition after the treatment is preferably not less than 1% by mass, more preferably not less than 2% by mass and even more preferably not less than 3% by mass from the viewpoint of improving storage stability of the resulting ink composition when compounding the pigment composition in an ink for ink-jet printing, etc., and is also preferably not more than 10% by mass, more preferably not more than 8% by mass and even more preferably not more than 7% by mass from the viewpoint of improving optical density of the resulting ink composition upon printing.

In the case of using the raw material pigment composition the content of water in the pigment composition after the treatment is preferably not less than 50% by mass, more preferably not less than 60% by mass and even more preferably not less than 70% by mass from the viewpoint of improving storage stability of the resulting ink composition, and is also preferably not more than 99% by mass, more preferably not more than 90% by mass and even more preferably not more than 85% by mass from the viewpoint of improving optical density of the resulting ink composition upon printing.

In accordance with the present invention, there is also provided a process for producing a pigment composition, including the step of subjecting a raw material pigment composition containing C.I. Pigment Yellow 74, the compound (I) represented by the aforementioned formula (I-1) or (I-2) and water to treatment with hydrogen peroxide. The production conditions used in the aforementioned production process are the same as described above.

The treatment with hydrogen peroxide may also be conducted by adding a hydrogen peroxide aqueous solution to the raw material pigment composition as described above.

[Method of Reducing Content of Compound (I)]

The method of reducing a content of the compound (I) according to the present invention is a method of reducing a content of the compound (I) in the raw material pigment composition containing PY74 and the compound (I), which includes the step of subjecting the raw material pigment composition to treatment with an oxidizing agent.

The details of the treatment with the oxidizing agent are the same as those described above.

[Method of Preventing Occurrence of Ejection Defects of Ink for Ink-Jet Printing]

The method of preventing occurrence of ejection defects of an ink for ink-jet printing according to the present invention is such a method in which the pigment composition produced by the production process of the present invention is compounded in the ink for ink-jet printing to prevent occurrence of ejection defects of the ink for ink-jet printing.

The details of the process for producing the pigment composition are the same as those described above. In addition, the method of compounding the pigment composition in the ink for ink-jet printing may be conducted by an ordinary method.

With respect to the aforementioned embodiments, the present invention further provides the following aspects relating to the process for producing the pigment composition and the method of reducing a content of the compound (I).

<1> A process for producing a pigment composition, including the step of subjecting a raw material pigment composition containing C.I. Pigment Yellow 74 and a compound (I) represented by the following formula (I-1) or (I-2) to a treatment with an oxidizing agent, in which a content of the compound (I) in the pigment composition after the treatment with the oxidizing agent on the basis of a content of the C.I. Pigment Yellow 74 in the pigment composition after the treatment with the oxidizing agent is not more than 1,200 mg/kg:

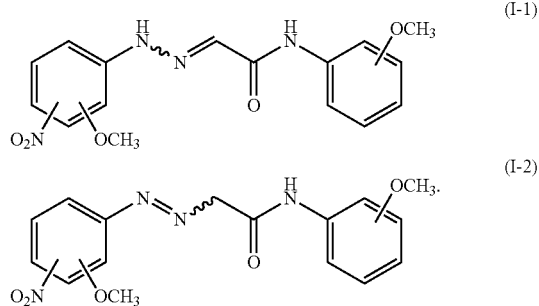

<2> The process for producing a pigment composition according to the aspect <1>, wherein the compound represented by the formula (I-1) is a compound represented by the following formula (I-1-1), and the compound represented by the formula (I-2) is a compound represented by the following formula (I-2-1):

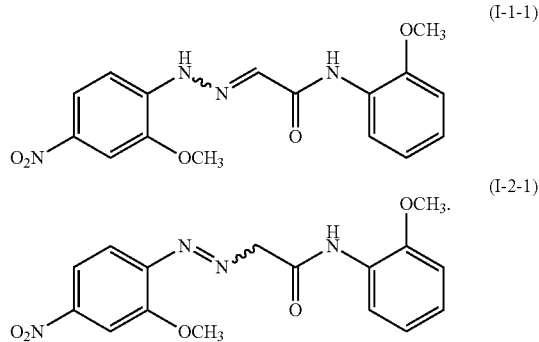

<3> The process for producing a pigment composition according to the aspect <1> or <2>, wherein the C.I. Pigment Yellow 74 is produced by a method of subjecting a diazotization product of m-nitro-o-anisidine to coupling reaction with acetoacetic-o-anisidide.

<4> The process for producing a pigment composition according to any one of the aspects <1> to <3>, wherein a total content of the C.I. Pigment Yellow 74 and the compound (I) in the raw material pigment composition is preferably not less than 0.1% by mass, more preferably not less than 0.3% by mass, even more preferably not less than 0.5% by mass, further even more preferably not less than 1% by mass, still further even more preferably not less than 2% by mass, still further even more preferably not less than 3% by mass, still further even more preferably not less than 5% by mass, still further even more preferably not less than 8% by mass, still further even more preferably not less than 10% by mass and still further even more preferably not less than 15% by mass, and is also preferably not more than 30% by mass and more preferably not more than 25% by mass.

<5> The process for producing a pigment composition according to any one of the aspects <1> to <4>, wherein a content of water in the raw material pigment composition is preferably not less than 50% by mass, more preferably not less than 60% by mass and even more preferably not less than 65% by mass, and is also preferably not more than 99% by mass, more preferably not more than 97% by mass, even more preferably not more than 95% by mass and further even more preferably not more than 90% by mass.

<6> The process for producing a pigment composition according to any one of the aspects <3> to <5>, wherein the raw material pigment composition is a raw material pigment composition (i) containing the C.I. Pigment Yellow 74 obtained by the coupling reaction as described in the aspect <3> and water, a raw material pigment composition (ii) obtained by mixing the C.I. Pigment Yellow 74 with water, or a raw material pigment composition (iii) formed by dispersing the C.I. Pigment Yellow 74 in water with a polymer dispersant.

<7> The process for producing a pigment composition according to the aspect <6>, wherein the polymer dispersant is a synthetic polymer, and the synthetic polymer is in the form of a copolymer containing a constitutional unit derived from a hydrophobic group-containing monomer and a constitutional unit derived from a hydrophilic group-containing monomer.

<8> The process for producing a pigment composition according to the aspect <6> or <7>, wherein in the case where the raw material pigment composition is the raw material pigment compositions (i) and (ii) as described in the aspect <6>, a total content of the C.I. Pigment Yellow 74 and the compound (I) in the raw material pigment composition is preferably not less than 0.1% by mass, more preferably not less than 0.3% by mass, even more preferably not less than 0.5% by mass and further even more preferably not less than 1% by mass, and is also preferably not more than 10% by mass, more preferably not more than 5% by mass and even more preferably not more than 3% by mass.

<9> The process for producing a pigment composition according to the aspect <6> or <7>, wherein in the case where the raw material pigment composition is the raw material pigment composition (iii) as described in the aspect <6>, a total content of the C.I. Pigment Yellow 74 and the compound (I) in the raw material pigment composition is preferably not less than 1% by mass, more preferably not less than 2% by mass, even more preferably not less than 5% by mass and further even more preferably not less than 8% by mass, and is also preferably not more than 30% by mass, more preferably not more than 25% by mass and even more preferably not more than 20% by mass.

<10> The process for producing a pigment composition according to the aspect <6> or <7>, wherein in the case where the raw material pigment composition is the raw material pigment composition (iii) as described in the aspect <6>, a content of the polymer dispersant in the raw material pigment composition is preferably not less than 1% by mass, more preferably not less than 2% by mass and even more preferably not less than 3% by mass, and is also preferably not more than 10% by mass, more preferably not more than 8% by mass and even more preferably not more than 7% by mass.

<11> The process for producing a pigment composition according to any one of the aspects <1> to <10>, wherein the treatment with the oxidizing agent is carried out by adding an aqueous solution of the oxidizing agent or a solid inorganic peroxide.

<12> The process for producing a pigment composition according to the aspect <11>, wherein the solid inorganic peroxide is preferably at least one compound selected from the group consisting of percarbonates and perborates of alkali metals, more preferably at least one compound selected from the group consisting of sodium percarbonate and sodium perborate, and even more preferably sodium percarbonate.

<13> The process for producing a pigment composition according to any one of the aspects <1> to <12>, wherein a mass ratio of an amount of the oxidizing agent added to a total content of the C.I. Pigment Yellow 74 and the compound (I) (raw material pigment content) in the raw material pigment composition upon the treatment with the oxidizing agent (amount of oxidizing agent added/raw material pigment content) is preferably not less than 0.001, more preferably not less than 0.005, even more preferably not less than 0.01, further even more preferably not less than 0.012 and still further even more preferably not less than 0.015, and in some cases, may be not less than 0.05, not less than 0.1, not less than 0.3 or not less than 0.5, and is also preferably not more than 10, more preferably not more than 5, even more preferably not more than 3, further even more preferably not more than 2 and still further even more preferably not more than 1.3.

<14> The process for producing a pigment composition according to any one of the aspects <1> to <13>, wherein a concentration of the oxidizing agent in the reaction system upon the treatment with the oxidizing agent is preferably not less than 0.001% by mass, more preferably not less than 0.01% by mass, even more preferably not less than 0.1% by mass, further even more preferably not less than 1% by mass and still further even more preferably not less than 2% by mass, and is also preferably not more than 30% by mass, more preferably not more than 10% by mass and even more preferably not more than 5% by mass.

<15> The process for producing a pigment composition according to any one of the aspects <1> to <14>, wherein a temperature used upon the treatment with the oxidizing agent is preferably not lower than 20° C., more preferably not lower than 40° C., even more preferably not lower than 50° C., further even more preferably not lower than 60° C. and still further even more preferably not lower than 70° C., and is also preferably not higher than 95° C., more preferably not higher than 93° C. and even more preferably not higher than 91° C., and in some cases, may be not higher than 90° C., for example, not higher than 85° C.

<16> The process for producing a pigment composition according to any one of the aspects <1> to <15>, wherein a time of the treatment with the oxidizing agent is preferably not less than 5 minutes, more preferably not less than 10 minutes, even more preferably not less than 20 minutes, further even more preferably not less than 30 minutes, still further even more preferably not less than 40 minutes and still further even more preferably not less than 50 minutes, and is also preferably not more than 10 hours, more preferably not more than 8 hours, even more preferably not more than 5 hours, further even more preferably not more than 3 hours and still further even more preferably not more than 2 hours.

<17> The process for producing a pigment composition according to any one of the aspects <1> to <16>, wherein a pH value within the reaction system upon the treatment with the oxidizing agent is preferably not less than 3, more preferably not less than 4, even more preferably not less than 5, further even more preferably not less than 7, still further even more preferably not less than 8, still further even more preferably not less than 9 and still further even more preferably not less than 10, and in some cases, may be preferably not less than 5, more preferably not less than 6, even more preferably not less than 7 and further even more preferably not less than 8, and is also preferably not more than 13, more preferably not more than 12, even more preferably not more than 9, further even more preferably not more than 8 and still further even more preferably not more than 7.

<18> The process for producing a pigment composition according to any one of the aspects <1> to <17>, wherein a shear rate of a stirring blade during the treatment with the oxidizing agent is not less than 10 $S^{-1}$ and not more than 100000 $s^{-1}$.

<19> The process for producing a pigment composition according to any one of the aspects <1> to <18>, wherein an ascorbic acid salt is further added upon the treatment with hydrogen peroxide.

<20> The process for producing a pigment composition according to the aspect <19>, wherein the ascorbic acid salt is preferably an ascorbic acid alkali metal salt, more preferably at least one compound selected from the group consisting of sodium ascorbate and potassium ascorbate, and even more preferably sodium ascorbate.

<21> The process for producing a pigment composition according to the aspect <19> or <20>, wherein a mass ratio of an amount of the ascorbic acid salt added to the amount of the hydrogen peroxide added (amount of ascorbic acid salt added/amount of hydrogen peroxide added) is preferably not less than 0.01, more preferably not less than 0.05, even more preferably not less than 0.1, further even more preferably not less than 0.3 and still further even more preferably not less than 0.5, and is also preferably not more than 3, more preferably not more than 2.5, even more preferably not more than 2, further even more preferably not more than 1.5 and still further even more preferably not more than 1.

<22> The process for producing a pigment composition according to any one of the aspects <1> to <21>, wherein the treatment with the oxidizing agent is preferably a treatment with at least one compound selected from the group consisting of a peroxide, and an oxygen acid or a salt thereof, more preferably a treatment with at least one compound selected from the group consisting of hydrogen peroxide and a hypochlorous acid alkali metal salt, even more preferably a treatment with at least one compound selected from the group consisting of hydrogen peroxide, sodium hypochlorite, potassium hypochlorite and lithium hypochlorite, and further even more preferably a treatment with at least one compound selected from the group consisting of hydrogen peroxide and sodium hypochlorite.

<23> The process for producing a pigment composition according to the aspect <22>, wherein the treatment with hypochlorite is a treatment conducted by adding at least one hypochlorous acid alkali metal salt selected from the group consisting of sodium hypochlorite, potassium hypochlorite and lithium hypochlorite.

<24> The process for producing a pigment composition according to any one of the aspects <1> to <23>, wherein a content of the compound (I) in the pigment composition after the treatment as measured in terms of a residual rate of the compound (I) in the pigment composition on the basis of the content of the compound (I) in the raw material pigment composition before the treatment is preferably not more than 80%, more preferably not more than 75%, even more preferably not more than 70%, further even more preferably not more than 65%, still further even more preferably not more than 60%, still further even more preferably not more than 55% and still further even more preferably not more than 50%, and is also preferably not less than 5%, more preferably not less than 10%, even more preferably not less than 15%, further even more preferably not less than 18% and still further even more preferably not less than 20%.

<25> The process for producing a pigment composition according to any one of the aspects <1> to <24>, wherein the content of the compound (I) in the pigment composition after the treatment on the basis of the content of the C.I. Pigment Yellow 74 in the pigment composition after the treatment is preferably not more than 1,100 mg/kg, more preferably not more than 1,000 mg/kg, even more preferably not more than 850 mg/kg, further even more preferably not more than 750 mg/kg and still further even more preferably not more than 650 mg/kg, and is also preferably not less than 80 mg/kg, more preferably not less than 100 mg/kg, even more more preferably not less than 130 mg/kg, further even more preferably not less than 150 mg/kg and still further even more preferably not less than 180 mg/kg.

<26> The process for producing a pigment composition according to any one of the aspects <1> to <25>, wherein a content of the C.I. Pigment Yellow 74 in the pigment composition after the treatment as measured in terms of a residual rate of the C.I. Pigment Yellow 74 in the pigment composition on the basis of a content of the C.I. Pigment Yellow 74 in the raw material pigment composition before the treatment is preferably not less than 80%, more preferably not less than 90%, even more preferably not less than 95%, further even more preferably not less than 98%, still further even more preferably not less than 99% and most preferably 100%.

<27> A process for producing a pigment composition, including the step of subjecting a raw material pigment composition containing C.I. Pigment Yellow 74, a compound (I) represented by the aforementioned formula (I-1) or (I-2) and water to a treatment with hydrogen peroxide.

<28> The process for producing a pigment composition according to the aspect <27>, wherein the treatment with hydrogen peroxide is carried out by adding a hydrogen peroxide aqueous solution to the raw material pigment composition.

<29> A method of reducing a content of a compound (I) represented by the aforementioned formula (I-1) or (I-2) in a raw material pigment composition containing C.I. Pigment Yellow 74 and the compound (I) represented by the aforementioned formula (I-1) or (I-2), said method including the step of subjecting the raw material pigment composition to a treatment with an oxidizing agent.

<30> The method of reducing a content of a compound (I) according to the aspect <29>, wherein the content of the compound (I) in the pigment composition after the treatment on the basis of the content of the C.I. Pigment Yellow 74 in the pigment composition after the treatment is preferably not more than 1,200 mg/kg, more preferably not more than 1,100 mg/kg, even more preferably not more than 1,000 mg/kg, further even more preferably not more than 850 mg/kg, still further even more preferably not more than 750 mg/kg and still further even more preferably not more than 650 mg/kg, and is also preferably not less than 80 mg/kg, more preferably not less than 100 mg/kg, even more more preferably not less than 130 mg/kg, further even more preferably not less than 150 mg/kg and still further even more preferably not less than 180 mg/kg.

<31> A pigment composition produced by the process according to any one of the aspects <1> to <28>.

<32> A method of preventing an ink for ink-jet printing from suffering from ejection defects, including the step of compounding the pigment composition produced by the process according to any one of the aspects <1> to <28> in the ink for ink-jet printing.

EXAMPLES

Quantitative Determination of Compound (I)

(1) In Case of Examples 1 to 19 and Comparative Example 1

The pigment compositions before and after the treatment with hydrogen peroxide were respectively maintained under reduced pressure at 40° C. for 24 hours to remove water therefrom, thereby obtaining the pigment in the form of particles. The thus obtained pigment in the form of particles was dissolved in tetrahydrofuran (THF for high-speed liquid chromatography) available from Wako Pure Chemical Industries, Ltd., and diluted 10,000 times by mass therewith. Then, the obtained diluted solution was filtered through a 0.45 μm-mesh filter "EKIKURODISK 13Cr" available from Pall Corporation.

(2) In Case of Examples 20 to 31 and Comparative Example 2

The pigment compositions as the resulting aqueous pigment dispersions were respectively maintained under reduced pressure at 70° C. for 24 hours to remove water therefrom, thereby obtaining a mixture containing the pigment in the form of particles and the resin as the polymer dispersant. The thus obtained mixture was dissolved in tetrahydrofuran (THF for high-speed liquid chromatography) available from Wako Pure Chemical Industries, Ltd., and diluted 10,000 times by mass therewith. Then, the obtained diluted solution was filtered through a 0.45 μm-mesh filter "EKIKURODISK 13Cr" available from Pall Corporation.

The resulting pigment-containing THF solutions obtained in the aforementioned items (1) and (2) were respectively subjected to mass spectrometry under the following measuring conditions using a liquid chromatograph mass spectrometer "LCMS-2020" available from Shimadzu Corporation to thereby conduct quantitative determination of the compound (I) (m/z: 345). Meanwhile, the retention time of the compound (I) was from 2.8 to 3.2 minutes.

The content of the compound (I) on the basis of the pigment (mg/kg) was obtained from the thus determined quantity of the compound (I).

(Measuring Conditions)

Eluent A: {Formic acid/ammonium formate buffer solution; pH: 3.0}: MeOH=10:90 (volume ratio at 25° C.)

Eluent B: Methanol:THF:formic acid=10:90:0.1 (volume ratio at 25° C.) (The formic acid and ammonium formate both were "guaranteed" reagents available from Wako Pure Chemical industries, Ltd., and the methanol and THF both were reagents (for high-speed chromatograph) available from Wako Pure Chemical Industries, Ltd.

Gradient elution conditions: B0% (0 minute)-B0% (5 minutes)-B100% (5.1 minutes)-B100% (7 minutes)-B0% (7.1 minutes)-B0% (13 minutes)

Column: "L-Column 2 ODS" (2.1×150 mm, 5 μm) available from Chemicals Evaluation and Research Institute, Japan Detection: MS (Electrospray Ionization (ESI) method; ionization mode: positive)

Amount injected: 10 μL

Quantitative determination method:

The compound (I) obtained by the following isolation method was dissolved in methanol to obtain solutions for preparation of a calibration curve having concentrations of 0.1, 0.5, 1, 5, 10, 50 and 100 mg/kg, respectively. Using the aforementioned LCMS-2020, the thus obtained solutions were subjected to mass spectrometry under the aforementioned measuring conditions to prepare a calibration curve for quantitative determination of the compound (I). From the obtained peak value, the content of the compound (I) was quatitativbely determined using the calibration curve thus prepared.

(Method for Isolation of Compound (I))

The compound (I) was isolated by the method for isolation of the compound (I) as described in the paragraph [0040] of Japanese Patent Application No. 2014-149870.

The thus isolated compound was analyzed using MS-MS "Q-Exactive" (positive mode) available from Thermo Fisher Scientific Inc. As a result, it was shown that the compound had m/z: 345 ([M+H]$^+$ ion: 345.1194 $C_{16}H_{17}O_5N_4$). Furthermore, as a result of subjecting the compound to fragment analysis, it was confirmed that the compound (I) was a compound represented by the aforementioned formula (I-1-1) or (I-2-1).

Main fragments detected are as follows.

[CONHC$_6$H$_4$OCH$_3$]$^+$ ion; 150.0551,

[NC$_6$H$_3$(NO$_2$)(OCH$_3$)]+H]$^+$ ion; 167.0452,

[COCH$_2$NNC$_6$H$_3$(NO$_2$)(OCH$_3$)]$^+$ ion; 222.0511

<Measurement of Average Particle Sizes>

With respect to the raw material pigment composition and the pigment composition obtained after the treatment with hydrogen peroxide which both were in the form of an aqueous pigment dispersion, the average particle size of particles in the respective aqueous pigment dispersions was measured (cumulant analysis) using a laser particle analyzing system "ELS-8000" available from Otsuka Electrics Co., Ltd. The measurement was conducted at a temperature of 25° C., an angle between incident light and detector of 90° and a cumulative number of 100 times, and a refractive index of water (1.333) was input to the analyzing system as a refractive index of the dispersing medium. Further, the measurement was conducted by adjusting the concentration of the dispersion to be measured to 5×10$^{-3}$% by weight.

<Measurement of Weight-Average Molecular Weight>

The weight-average molecular weight was measured by gel permeation chromatography [GPC apparatus: "HLC-8120GPC" available from Tosoh Corporation; column: "TSK-GEL α-M"×2 available from Tosoh Corporation; flow rate: 1 mL/min)] using N,N-dimethyl formamide in which phosphoric acid and lithium bromide were dissolved in amounts of 60 mmol/L and 50 mmol/L, respectively, as an eluent, and using a polystyrene as a reference standard substance.

<Color Difference of Pigment Between Before and after Treatment with Hydrogen Peroxide>

The degree of discoloration of the pigment in the respective pigment compositions between before and after the treatment with hydrogen peroxide was measured using a differential colorimeter. As the differential colorimeter, "CR-400" available from Konica Minolta Japan, Inc., was used, and the obtained value was calibrated using a white calibration plate (Y: 86.7, x: 0.3156, y: 0.3228). Then, about 0.05 g of the pigment in the form of particles before being subjected to the treatment with hydrogen peroxide was filled in a micro petri dish available from Konica Minolta Japan, Inc., and the values of coordinates L*, a*, b* in L*, a*, b* color specification system were measured in a dark field. The thus obtained values were used as reference values for determination of the color difference.

Thereafter, the aforementioned pigment in the form of particles was subjected to the treatment with hydrogen peroxide and then the procedure described in the aforementioned item <Quantitative Determination of Compound (I)>. Then, 0.05 g of the thus obtained pigment particles were filled in a micro petri dish, and the values of coordinates L*, a*, b* thereof were measured in a dark field.

From the values obtained above, the color difference ΔE* defined by ΔL*, Δa* and Δb* as the difference values of L*, a* and b*, respectively, was calculated according to the following formula and evaluated.

$$\Delta E^* = [(\Delta L^*)^2 + (\Delta a^*)^2 + (\Delta b^*)^2]^{0.5}$$

Preparation Example 1 (Preparation of Raw Material Pigment Composition)

A mixture prepared by mixing 10 parts by mass of PY74 "Fast Yellow 7413-A" as a yellow pigment available from Sanyo Color Works, Ltd., and 90 parts by mass of ion-exchanged water at room temperature (25° C.) was dispersed by a high-speed emulsifying disperser "T.K. ROBOMIX" available from Primix Corporation equipped with a φ32 disper blade at a rotating speed of 6400 rpm for 30 minutes, thereby obtaining a raw material pigment composition.

Example 1

A 500 mL separable flask was charged with 30 parts by mass of the raw material pigment composition obtained in Preparation Example 1, 10 parts by mass of a 30% by mass hydrogen peroxide aqueous solution (3.0 parts by mass as hydrogen peroxide) available from Sigma-Aldrich Inc., and 60 parts by mass of ion-exchanged water, and then 2.7 parts by mass of a 5N sodium hydroxide aqueous solution was added to the flask to adjust a pH value of the reaction mixture in the flask to 11.0. At this time, the concentration of hydrogen peroxide in the reaction system was 2.9% by mass. Thereafter, the contents of the flask were heated to 80° C., and allowed to stand at 80° C. while stirring for 1 hour and then air-cooled to 40° C., thereby obtaining a pigment composition.

The contents of the compound (1) per 1 kg of PY74 in the raw material pigment composition before the treatment with hydrogen peroxide and the pigment composition after the treatment with hydrogen peroxide were measured to calculate a residual rate of the compound (I) in the pigment composition. The results are shown in Table 1.

Example 2

The same procedure as in Example 1 was repeated except that the temperature upon the treatment with hydrogen peroxide was adjusted to room temperature (25° C.), thereby obtaining a pigment composition. The results are shown in Table 1.

Preparation Example 2 (Preparation of Raw Material Pigment Composition)

A mixture prepared by mixing 10 parts by mass of PY74 "Fast Yellow 74: FY840" (tradename) as a yellow pigment available from Dainichiseika Color & Chemicals Mfg. Co., Ltd., and 90 parts by mass of ion-exchanged water at room temperature (25° C.) was dispersed by a high-speed emulsifying disperser "T.K. ROBOMIX" available from Primix Corporation equipped with a ϕ32 disper blade at a rotating speed of 6400 rpm for 30 minutes, thereby obtaining a raw material pigment composition.

Examples 3 to 6

A 1 L separable flask (SUS 304) was charged with 30 parts by mass of the raw material pigment composition obtained in Preparation Example 2 and 60 parts by mass of ion-exchanged water, and then anhydrous sodium carbonate was charged into the flask as shown in Table 1 to adjust a pH value of the reaction mixture in the flask to a desired value. Thereafter, 0.06 part by mass of a 30% by mass hydrogen peroxide aqueous solution (0.018 part by mass as hydrogen peroxide) available from Sigma-Aldrich Inc., was charged into the flask, and the contents of the flask were heated to 90° C. Then, the contents of the flask were allowed to stand at 90° C. for 1 hour while stirring with an anchor blade having a blade diameter of 6.5 cm at a rotating speed of 150 rpm (peripheral speed of a tip end of the blade: 0.3 m/s), and then 0.06 part by mass of a 30% by mass hydrogen peroxide aqueous solution (0.018 part by mass as hydrogen peroxide) was further charged into the flask. Further, after the contents of the flask were allowed to stand for 1 hour while stirring (after the elapse of total 2 hours from initiation of the heating), 0.06 part by mass of a 30% by mass hydrogen peroxide aqueous solution (0.018 part by mass as hydrogen peroxide) was further charged into the flask. Furthermore, after the contents of the flask were allowed to stand for 1 hour while stirring (after the elapse of total 3 hours from initiation of the heating), the contents of the flask were air-cooled to 40° C., thereby obtaining a pigment composition.

The contents of the compound (1) per 1 kg of PY74 in the raw material pigment composition before the treatment with hydrogen peroxide and the pigment composition after the treatment with hydrogen peroxide were measured to calculate a residual rate of the compound (I) in the pigment composition. The results are shown in Table 1.

Example 7

The same procedure as in Example 4 was repeated except that the temperature upon the treatment with hydrogen peroxide was adjusted to 70° C., thereby obtaining a pigment composition. The results are shown in Table 1.

Example 8

The same procedure as in Example 4 was repeated except that the temperature upon the treatment with hydrogen peroxide was adjusted to 25° C., thereby obtaining a pigment composition. The results are shown in Table 1.

Example 9

The same procedure as in Example 4 was repeated except that the concentration of hydrogen peroxide used was increased 10 times that used in Example 4, thereby obtaining a pigment composition. The results are shown in Table 1.

Examples 10 to 12

The same procedure as in Example 4 was repeated except that a 5N sodium hydroxide aqueous solution was used in place of the anhydrous sodium carbonate, thereby obtaining a pigment composition. The results are shown in Table 1.

Examples 13 and 14

A 3 L separable flask was charged with 30 parts by mass of the raw material pigment composition obtained in Preparation Example 2 and 60 parts by mass of ion-exchanged water, and then anhydrous sodium carbonate was charged into the flask as shown in Table 1 to adjust a pH value of the reaction mixture in the flask to a desired value. Thereafter, 0.06 part by mass of a 30% by mass hydrogen peroxide aqueous solution (0.018 part by mass as hydrogen peroxide) available from Sigma-Aldrich Inc., was charged into the flask, and the contents of the flask were heated to 90° C. Then, the contents of the flask were allowed to stand at 90° C. for 1 hour while stirring with a high-speed emulsifying disperser "T.K. ROBOMIX" available from Primix Corporation equipped with a ϕ32 disper blade at a rotating speed of 4000 rpm (peripheral speed of a tip end of the blade: 6.9 m/s; shear rate: 138 $s^{-1}$) or at a rotating speed of 8000 rpm (peripheral speed of a tip end of the blade: 13.4 m/s; shear rate: 268 $s^{-1}$), and then 0.06 part by mass of a 30% by mass hydrogen peroxide aqueous solution (0.018 part by mass as hydrogen peroxide) was further charged into the flask. Further, after the contents of the flask were allowed to stand for 1 hour while stirring (after the elapse of total 2 hours from initiation of the heating), 0.06 part by mass of a 30% by mass hydrogen peroxide aqueous solution (0.018 part by mass as hydrogen peroxide) was further charged into the flask. Furthermore, after the contents of the flask were allowed to stand for 1 hour while stirring (after the elapse of total 3 hours from initiation of the heating), the contents of the flask were air-cooled to 40° C., thereby obtaining a pigment composition. The results are shown in Tables 1 and 2.

Example 15

A 30 L jacketed stirring vessel was charged with 30 parts by mass of the raw material pigment composition obtained in Preparation Example 2 and 60 parts by mass of ion-exchanged water, and then anhydrous sodium carbonate was charged into the flask as shown in Table 1 to adjust a pH value of the reaction mixture in the flask to a desired value. Thereafter, 0.06 part by mass of a 30% by mass hydrogen peroxide aqueous solution (0.018 part by mass as hydrogen peroxide) available from Sigma-Aldrich Inc., was charged into the flask, and the contents of the flask were heated to 90° C. After that, the obtained reaction solution in the stirring vessel was discharged through a bottom discharge valve thereof and fed to a disperser "CAVITRON" available from EUROTEC Co., Ltd., where the particles in the reaction solution were deggregated at a peripheral speed of a tip end of a stirring blade of 40 m/s (shear rate: 80000 s$^{-1}$). Then, the contents of the flask were returned to the stirring vessel to conduct a circulation operation thereof. After the elapse of 1 hour from initiation of the heating, 0.06 part by mass of a 30% by mass hydrogen peroxide aqueous solution (0.018 part by mass as hydrogen peroxide) was further charged into the flask. Further, after the contents of the flask were allowed to stand for 1 hour while stirring (after the elapse of total 2 hours from initiation of the heating), 0.06 part by mass of a 30% by mass hydrogen peroxide aqueous solution (0.018 part by mass as hydrogen peroxide) was further charged into the flask. Furthermore, after the contents of the flask were allowed to stand for 1 hour while stirring (after the elapse of total 3 hours from initiation of the heating), the contents of the flask were air-cooled to 40° C., thereby obtaining a pigment composition. The results are shown in Tables 1 and 2.

Example 16

A 1 L separable flask (SUS 304) was charged with 30 parts by mass of the raw material pigment composition obtained in Preparation Example 2 and 60 parts by mass of ion-exchanged water, and then anhydrous sodium carbonate was charged into the flask as shown in Table 1 to adjust a pH value of the reaction mixture in the flask to a desired value. Thereafter, 0.18 part by mass of a 30% by mass hydrogen peroxide aqueous solution (0.054 part by mass as hydrogen peroxide) available from Sigma-Aldrich Inc., was charged into the flask, and the contents of the flask were heated to 90° C. Then, the contents of the flask were allowed to stand at 90° C. for 3 hours while stirring with an anchor blade having a blade diameter of 6.5 cm at a rotating speed of 150 rpm (peripheral speed of a tip end of the blade: 0.3 m/s), and then the contents of the flask were air-cooled to 40° C., thereby obtaining a pigment composition. The results are shown in Table 1.

Examples 17 and 18

A 1 L separable flask (SUS 304) was charged with 30 parts by mass of the raw material pigment composition obtained in Preparation Example 2 and 60 parts by mass of ion-exchanged water, and then 0.4 part by mass of a 4.5% by mass sodium hypochlorite aqueous solution (0.018 part by mass as sodium hypochlorite) was charged into the flask, and the contents of the flask were heated to 90° C. Thereafter, the contents of the flask were allowed to stand at 90° C. for 1 hour while stirring with an anchor blade having a blade diameter of 6.5 cm at a rotating speed of 150 rpm (peripheral speed of a tip end of the blade: 0.3 m/s), and then 0.4 part by mass of a 4.5% by mass sodium hypochlorite aqueous solution (0.018 part by mass as sodium hypochlorite) was charged into the flask. Further, after the contents of the flask were allowed to stand for 1 hour while stirring (after the elapse of total 2 hours from initiation of the heating), 0.4 part by mass of a 4.5% by mass sodium hypochlorite aqueous solution (0.018 part by mass as sodium hypochlorite) was further charged into the flask. Furthermore, after the contents of the flask were allowed to stand for 1 hour while stirring (after the elapse of total 3 hours from initiation of the heating), the contents of the flask were air-cooled to 40° C., thereby obtaining a pigment composition. The results are shown in Table 1.

Example 19

A 1 L separable flask (SUS 304) was charged with 30 parts by mass of the raw material pigment composition obtained in Preparation Example 2 and 60 parts by mass of ion-exchanged water, and then 1.2 parts by mass of a 4.5% by mass sodium hypochlorite aqueous solution (0.054 part by mass as sodium hypochlorite) was charged into the flask, and the contents of the flask were heated to 90° C. Thereafter, the contents of the flask were allowed to stand at 90° C. for 3 hours while stirring with an anchor blade having a blade diameter of 6.5 cm at a rotating speed of 150 rpm (peripheral speed of a tip end of the blade: 0.3 m/s), and then the contents of the flask were air-cooled to 40° C., thereby obtaining a pigment composition. The results are shown in Table 1.

Comparative Example 1

The same procedure as in Example 1 was repeated except that no hydrogen peroxide was added, and the amount of the 5N sodium hydroxide aqueous solution added was changed as shown in Table 1, thereby obtaining a pigment composition. The results are shown in Table 1.

TABLE 1

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| Raw material pigment composition (part(s) by mass) (% by mass)*1 | Raw material pigment*2 | | 3.0 (10) | 3.0 (10) | 3.0 (10) | 3.0 (10) | 3.0 (10) | 3.0 (10) | 3.0 (10) | 3.0 (10) | 3.0 (10) | 3.0 (10) |
| | Ion-exchanged water | | 27 (90) | 27 (90) | 27 (90) | 27 (90) | 27 (90) | 27 (90) | 27 (90) | 27 (90) | 27 (90) | 27 (90) |
| Treatment with hydrogen peroxide | Amount added (part(s) by mass) | Whole amount of hydrogen peroxide*3 | 3.0 | 3.0 | 0.054 | 0.054 | 0.054 | 0.054 | 0.054 | 0.054 | 0.540 | 0.054 |
| | | Whole amount of sodium hypochlorite | | | | | | | | | | |
| | | Ion-exchanged water*4 | 67 | 67 | 70 | 70 | 70 | 70 | 70 | 70 | 70 | 70 |
| | | 5N NaOH aqueous solution | 2.7 | 2.7 | | | | | | | | 0.001 |
| | | Anhydrous Na carbonate | | | 0 | 0.003 | 0.035 | 0.180 | 0.003 | 0.003 | 0.003 | |

TABLE 1-continued

|  |  |  | Examples |  |  |  |  |  |  |  |  |  |
|---|---|---|---|---|---|---|---|---|---|---|---|---|
|  |  |  | 1 | 2 | 3 | 4 | 5 | 6 | 7 | 8 | 9 | 10 |
| Treatment with hydrogen peroxide | Conditions of treatment | Mass ratio (amount of $H_2O_2$ added/raw material pigment content (*²)) | 1.0 | 1.0 | 0.018 | 0.018 | 0.018 | 0.018 | 0.018 | 0.018 | 0.180 | 0.018 |
|  |  | Mass ratio (amount of Na hypochlorite added/raw material pigment content (*²)) |  |  |  |  |  |  |  |  |  |  |
|  |  | pH after adding NaOH | 11 | 11 | 8 | 9 | 10 | 11 | 9 | 9 | 9 | 9 |
|  |  | Amount of $H_2O_2$ added after 0 h (*ᵃ) | 3.0 | 3.0 | 0.018 | 0.018 | 0.018 | 0.018 | 0.018 | 0.018 | 0.18 | 0.018 |
|  |  | Amount of $H_2O_2$ added after 1 h (*ᵇ) | 0.0 | 0.0 | 0.018 | 0.018 | 0.018 | 0.018 | 0.018 | 0.018 | 0.18 | 0.018 |
|  |  | Amount of $H_2O_2$ added after 2 h (*ᶜ) | 0.0 | 0.0 | 0.018 | 0.018 | 0.018 | 0.018 | 0.018 | 0.018 | 0.18 | 0.018 |
|  |  | Peripheral speed of tip end of stirring blade [m/s] | 0.3 | 0.3 | 0.3 | 0.3 | 0.3 | 0.3 | 0.3 | 0.3 | 0.3 | 0.3 |
|  |  | Shear rate upon stirring [1/s] | 30 | 30 | 30 | 30 | 30 | 30 | 30 | 30 | 30 | 30 |
|  |  | Treatment temperature (° C.) | 80 | 25 | 90 | 90 | 90 | 90 | 70 | 25 | 90 | 90 |

NOTE
(*ᵃ): Amount of $H_2O_2$ added after the elapse of 0 h from initiation of treatment
(*ᵇ): Amount of $H_2O_2$ added after the elapse of 1 h from initiation of treatment
(*ᶜ): Amount of $H_2O_2$ added after the elapse of 2 h from initiation of treatment

|  |  |  | Examples |  |  |  |  |  |  |  |  |  |
|---|---|---|---|---|---|---|---|---|---|---|---|---|
|  |  |  | 1 | 2 | 3 | 4 | 5 | 6 | 7 | 8 | 9 | 10 |
| Pigment composition after treatment with hydrogen peroxide | Content of compound (I)*⁵ | Before treatment | 1351 | 1351 | 859 | 859 | 859 | 859 | 859 | 859 | 859 | 859 |
|  |  | After 1 h (*ᵈ) (mg/kg) | 632 | 1073 | 685 | 771 | 706 | 655 | 682 | 765 | 704 | 711 |
|  |  | After 2 h (*ᵉ) (mg/kg) |  |  | 651 | 685 | 665 | 618 | 701 | 726 | 602 | 661 |
|  |  | After 3 h (*ᶠ) (mg/kg) |  |  | 656 | 628 | 616 | 594 | 673 | 718 | 648 | 651 |
|  | Residual rate of compound (I)*⁶ | After 1 h (*ᵍ) (%) | 74 | 125 | 80 | 90 | 82 | 76 | 79 | 89 | 82 | 83 |
|  |  | After 2 h (*ʰ) (%) |  |  | 76 | 80 | 77 | 72 | 82 | 85 | 70 | 77 |
|  |  | After 3 h (*ⁱ) (%) |  |  | 76 | 73 | 72 | 69 | 78 | 84 | 75 | 76 |
|  | Color difference ΔE | After 1 h (*ʲ) (—) | 2.6 | 1.2 | 1.1 | 1.4 | 2.6 | 1.6 | 1.2 | 1.0 | 2.0 | 1.9 |
|  |  | After 2 h (*ᵏ) (—) |  |  | 1.6 | 1.2 | 2.4 | 1.5 | 1.6 | 1.5 | 2.3 | 2.9 |
|  |  | After 3 h (*ˡ) (—) |  |  | 1.9 | 2.0 | 2.2 | 2.2 | 1.5 | 2.8 | 1.4 | 2.9 |

NOTE
(*ᵈ): Content of compound (I) after the elapse of 1 h from initiation of treatment
(*ᵉ): Content of compound (I) after the elapse of 2 h from initiation of treatment
(*ᶠ): Content of compound (I) after the elapse of 3 h from initiation of treatment
(*ᵍ): Residual rate of compound (I) after the elapse of 1 h from initiation of treatment
(*ʰ): Residual rate of compound (I) after the elapse of 2 h from initiation of treatment
(*ⁱ): Residual rate of compound (I) after the elapse of 3 h from initiation of treatment
(*ʲ): Color difference ΔE after the elapse of 1 h from initiation of treatment
(*ᵏ): Color difference ΔE after the elapse of 2 h from initiation of treatment
(*ˡ): Color difference ΔE after the elapse of 3 h from initiation of treatment

|  |  |  | Examples |  |  |  |  |  |  |  |  | Comparative |
|---|---|---|---|---|---|---|---|---|---|---|---|---|
|  |  |  | 11 | 12 | 13 | 14 | 15 | 16 | 17 | 18 | 19 | Example 1 |
| Raw material pigment composition (part(s) by mass) (% by mass)*¹ | Raw material pigment*² |  | 3.0 (10) | 3.0 (10) | 3.0 (10) | 3.0 (10) | 3.0 (10) | 3.0 (10) | 3.0 (10) | 3.0 (10) | 3.0 (10) | 3.0 (10) |
|  | Ion-exchanged water |  | 27 (90) | 27 (90) | 27 (90) | 27 (90) | 27 (90) | 27 (90) | 27 (90) | 27 (90) | 27 (90) | 27 (90) |
| Treatment with hydrogen peroxide | Amount added (part(s) by mass) | Whole amount of hydrogen peroxide*³ | 0.054 | 0.054 | 0.054 | 0.054 | 0.054 | 0.054 |  |  |  | 0 |
|  |  | Whole amount of sodium hypochlorite |  |  |  |  |  |  | 0.054 | 0.108 | 0.054 |  |
|  |  | Ion-exchanged water*⁴ | 70 | 70 | 70 | 70 | 70 | 70 | 70 | 70 | 70 | 70 |
|  |  | 5N NaOH aqueous solution | 0.006 | 0.035 |  |  |  |  |  |  |  | 0.4 |
|  |  | Anhydrous Na carbonate |  |  | 0.003 | 0.035 | 0.003 | 0.003 |  |  |  |  |

TABLE 1-continued

|  |  |  | Examples |  |  |  |  |  |  |  |  | Comparative |
|---|---|---|---|---|---|---|---|---|---|---|---|---|
|  |  |  | 11 | 12 | 13 | 14 | 15 | 16 | 17 | 18 | 19 | Example 1 |
| Treatment with hydrogen peroxide | Conditions of treatment | Mass ratio (amount of H₂O₂ added/raw material pigment content (*²)) | 0.018 | 0.018 | 0.018 | 0.018 | 0.018 | 0.018 |  |  |  | — |
|  |  | Mass ratio (amount of Na hypochlorite added/raw material pigment content (*²)) |  |  |  |  |  |  | 0.018 | 0.036 | 0.018 |  |
|  |  | pH after adding NaOH | 10 | 11 | 9 | 9 | 9 | 9 | 10 | 10 | 10 | 11 |
|  |  | Amount of H₂O₂ added after 0 h (*ᵃ) | 0.018 | 0.018 | 0.018 | 0.018 | 0.018 | 0.054 | 0.018 | 0.036 | 0.054 |  |
|  |  | Amount of H₂O₂ added after 1 h (*ᵇ) | 0.018 | 0.018 | 0.018 | 0.018 | 0.018 | 0 | 0.018 | 0.036 | 0 |  |
|  |  | Amount of H₂O₂ added after 2 h (*ᶜ) | 0.018 | 0.018 | 0.018 | 0.018 | 0.018 | 0 | 0.018 | 0.036 | 0 |  |
|  |  | Peripheral speed of tip end of stirring blade [m/s] | 0.3 | 0.3 | 6.9 | 13.4 | 40.0 | 0.3 | 0.3 | 0.3 | 0.3 |  |
|  |  | Shear rate upon stirring [1/s] | 30 | 30 | 138 | 268 | 80000 | 30 | 30 | 30 | 30 |  |
|  |  | Treatment temperature (°C.) | 90 | 90 | 90 | 90 | 90 | 90 | 90 | 90 | 90 | 80 |

NOTE
(*ᵃ): Amount of H₂O₂ added after the elapse of 0 h from initiation of treatment
(*ᵇ): Amount of H₂O₂ added after the elapse of 1 h from initiation of treatment
(*ᶜ): Amount of H₂O₂ added after the elapse of 2 h from initiation of treatment

|  |  |  | Examples |  |  |  |  |  |  |  |  | Comparative |
|---|---|---|---|---|---|---|---|---|---|---|---|---|
|  |  |  | 11 | 12 | 13 | 14 | 15 | 16 | 17 | 18 | 19 | Example 1 |
| Pigment composition after treatment with hydrogen peroxide | Content of compound (I)*⁵ | Before treatment (mg/kg) | 859 | 859 | 859 | 859 | 859 | 859 | 859 | 859 | 859 | 1351 |
|  |  | After 1 h (*ᵈ) (mg/kg) | 707 | 679 | 690 | 668 | 548 | 708 | 827 | 810 | 713 |  |
|  |  | After 2 h (*ᵉ) (mg/kg) | 687 | 622 | 656 | 606 | 546 | 709 | 765 | 766 | 673 |  |
|  |  | After 3 h (*ᶠ) (mg/kg) | 640 | 589 | 628 | 500 | 534 | 695 | 771 | 685 | 697 | 1356 |
|  | Residual rate of compound (I)*⁶ | After 1 h (*ᵍ) (%) | 82 | 79 | 80 | 78 | 64 | 82 | 96 | 94 | 83 |  |
|  |  | After 2 h (*ʰ) (%) | 80 | 72 | 76 | 71 | 64 | 83 | 89 | 89 | 78 |  |
|  |  | After 3 h (*ⁱ) (%) | 75 | 69 | 73 | 58 | 62 | 81 | 90 | 80 | 81 | 100 |
|  | Color difference ΔE | After 1h (*ʲ) (—) | 1.3 | 1.8 | 1.9 | 0.6 | 0.6 | 1.5 | 1.9 | 2.0 | 2.0 |  |
|  |  | After 2 h (*ᵏ) (—) | 3.3 | 4.9 | 2.3 | 1.0 | 0.9 | 2.1 | 2.1 | 2.2 | 2.1 |  |
|  |  | After 3 h (*ˡ) (—) | 4.2 | 6.0 | 2.6 | 1.8 | 2.0 | 2.4 | 2.4 | 2.8 | 2.9 |  |

NOTE
(*ᵈ): Content of compound (I) after the elapse of 1 h from initiation of treatment
(*ᵉ): Content of compound (I) after the elapse of 2 h from initiation of treatment
(*ᶠ): Content of compound (I) after the elapse of 3 h from initiation of treatment
(*ᵍ): Residual rate of compound (I) after the elapse of 1 h from initiation of treatment
(*ʰ): Residual rate of compound (I) after the elapse of 2 h from initiation of treatment
(*ⁱ): Residual rate of compound (I) after the elapse of 3 h from initiation of treatment
(*ʲ): Color difference ΔE after the elapse of 1 h from initiation of treatment
(*ᵏ): Color difference ΔE after the elapse of 2 h from initiation of treatment
(*ˡ): Color difference ΔE after the elapse of 3 h from initiation of treatment

TABLE 2

|  |  |  | Examples |  |  |
|---|---|---|---|---|---|
|  |  |  | 13 | 14 | 15 |
| Raw material pigment composition (part(s) by mass) (% by mass)*¹ | Raw material pigment*² |  | 3.0 (10) | 3.0 (10) | 3.0 (10) |
|  | Ion-exchanged water |  | 27 (90) | 27 (90) | 27 (90) |
| Treatment with hydrogen peroxide | Amount added (part(s) by mass) | Whole amount of hydrogen peroxide*³ | 0.054 | 0.054 | 0.054 |
|  |  | Ion-exchanged water*⁴ | 70 | 70 | 70 |
|  |  | Anhydrous Na carbonate | 0.003 | 0.035 | 0.003 |
|  | Conditions of treatment | Mass ratio (amount of H₂O₂ added/raw material pigment content (*²)) | 0.018 | 0.018 | 0.018 |
|  |  | pH after adding alkali | 9 | 9 | 9 |

TABLE 2-continued

|  |  |  | Examples | | |
|---|---|---|---|---|---|
|  |  |  | 13 | 14 | 15 |
|  |  | Amount of $H_2O_2$ added after 0 h (*$^a$) | 0.018 | 0.018 | 0.018 |
|  |  | Amount of $H_2O_2$ added after 1 h (*$^b$) | 0.018 | 0.018 | 0.018 |
|  |  | Amount of $H_2O_2$ added after 2 h (*$^c$) | 0.018 | 0.018 | 0.018 |
|  |  | Peripheral speed of tip end of stirring blade [m/s] | 6.9 | 13.4 | 40.0 |
|  |  | Shear rate upon stirring [1/s] | 138 | 268 | 80000 |
|  |  | Treatment temperature (° C.) | 90 | 90 | 90 |
|  | Particle size during treatment | Before treatment (μm) | 40.4 | 40.4 | 40.4 |
|  |  | After 1 h (*$^d$) (μm) | 14.2 | 12.9 | 6.9 |
|  |  | After 2 h (*$^e$) (μm) | 18.1 | 11.3 | 6.9 |
|  |  | After 3 h (*$^f$) (μm) | 17.8 | 12.5 | 7.5 |
| Pigment composition after treatment with hydrogen peroxide | Content of compound (I)*$^5$ | Before treatment (mg/kg) | 859 | 859 | 859 |
|  |  | After 1 h (*$^g$) (mg/kg) | 690 | 668 | 548 |
|  |  | After 2 h (*$^h$) (mg/kg) | 656 | 606 | 546 |
|  |  | After 3 h (*$^i$) (mg/kg) | 628 | 500 | 534 |
|  | Residual rate of compound (I)*$^6$ | After 1 h (*$^j$) (%) | 80 | 78 | 64 |
|  |  | After 2 h (*$^k$) (%) | 76 | 71 | 64 |
|  |  | After 3 h (*$^l$) (%) | 73 | 58 | 62 |

NOTE
(*$^a$): Amount of $H_2O_2$ added after the elapse of 0 h from initiation of treatment
(*$^b$): Amount of $H_2O_2$ added after the elapse of 1 h from initiation of treatment
(*$^c$): Amount of $H_2O_2$ added after the elapse of 2 h from initiation of treatment
(*$^d$): Particle size after the elapse of 1 h from initiation of treatment
(*$^e$): Particle size after the elapse of 2 h from initiation of treatment
(*$^f$): Particle size after the elapse of 3 h from initiation of treatment
(*$^g$): Content of compound (I) after the elapse of 1 h from initiation of treatment
(*$^h$): Content of compound (I) after the elapse of 2 h from initiation of treatment
(*$^i$): Content of compound (I) after the elapse of 3 h from initiation of treatment
(*$^j$): Residual rate of compound (I) after the elapse of 1 h from initiation of treatment
(*$^k$): Residual rate of compound (I) after the elapse of 2 h from initiation of treatment
(*$^l$): Residual rate of compound (I) after the elapse of 3 h from initiation of treatment Meanwhile, the respective asterisked signs shown in Tables 1 and 2 have the following meanings.

1: The numerical values shown in parentheses in the respective Tables indicate contents (% by mass) of respective components in the raw material pigment composition.
2: The raw material pigment content indicates a total content of PY74 and the compound (I) in the raw material pigment composition.
3: Hydrogen peroxide was added in the form of a 30% by mass hydrogen peroxide aqueous solution, and the amount of the 30% by mass hydrogen peroxide aqueous solution added was shown in the respective Tables.
4: The amount of ion-exchanged water added includes an amount of water derived from the hydrogen peroxide aqueous solution.
5: Contents of the compound (I) per 1 kg of PY74 in the raw material pigment composition before the treatment and the pigment composition after the treatment.
6: Ratio of a content of the compound (I) in the respective pigment compositions after the treatment obtained in Examples 1 to 19 to a content of the compound (I) in the pigment composition after the treatment obtained in Comparative Example 1 was determined and defined as a residual rate of the compound (I) in the respective pigment compositions.

From Table 1, it was confirmed that the pigment compositions obtained in Examples 1 to 19 had a low residual rate of the compound (I) as compared to that of the pigment composition obtained in Comparative Example 1, and therefore the contents of the compound (I) in the respective pigment compositions obtained in Examples 1 to 19 were effectively reduced.

Meanwhile, it was separately confirmed that the content of PY74 in the respective pigment compositions after the treatment are the same as that before the treatment.

Production Example 1 (Production of Polymer Dispersant)

Twenty (20) parts by mass of methyl ethyl ketone and 0.03 part by mass of a chain transfer agent (2-mercaptoethanol) as well as 10% of the respective monomers shown in Table 3 were charged into a reaction vessel and mixed with each other, and then an inside atmosphere of the reaction vessel was fully replaced with a nitrogen gas, thereby obtaining a mixed solution.

Separately, remaining 90% of the respective monomers shown in Table 3, 0.27 part by mass of the aforementioned chain transfer agent, 60 parts by mass of methyl ethyl ketone and 1.2 parts by mass of a radical polymerization initiator "V-65" (2,2'-azobis(2,4-dimethylvaleronitrile)) available from Wako Pure Chemical Industries, Ltd., were charged into a dropping funnel and mixed with each other, and then an inside atmosphere of the dropping funnel was fully replaced with a nitrogen gas, thereby obtaining a mixed solution.

In a nitrogen atmosphere, the mixed solution in the reaction vessel was heated to 65° C. while stirring, and then the mixed solution in the dropping funnel was gradually added dropwise thereinto over 3 hours. After the elapse of 2 hours from completion of the dropwise addition while maintaining the resulting mixed solution at a temperature of 65° C., a solution prepared by dissolving 0.3 part by mass of the aforementioned radical polymerization initiator in 5 parts by mass of methyl ethyl ketone was added to the resulting reaction solution, and the reaction solution was further aged at 65° C. for 2 hours and at 70° C. for 2 hours, thereby obtaining a solution of a polymer dispersant having a weight-average molecular weight of 62,000. The results are shown in Table 3.

TABLE 3

| Production Example 1 | | |
|---|---|---|
| Kinds of monomers (part(s) by mass of solid components) | (a) Benzyl acrylate | 44 |
| | (b) Styrene macromer | 10 |
| | (c) Polyethylene glycol monomethacrylate | 30 |
| | (d) Methacrylic acid | 16 |
| Weight-average molecular weight of copolymer obtained | | 62,000 |

Meanwhile, the details of the compounds shown in Table 3 are as follows.

(b) Styrene macromer "AS-6(S)" (number-average molecular weight: 6,000; polymerizable group: methacryloxy group; solid content: 50%) available from Toagosei Co., Ltd.

(c) Polyethylene glycol monomethacrylatge "NK ESTER EH-4E" (average molar number of addition of ethyleneoxide: 4; end alkyl group: 2-ethylhexyl group) available from Shin-Nakamura Chemical Co., Ltd.

Preparation Example 3 (Preparation of Raw Material Pigment Composition)

Twenty five (25) parts by mass of a resin obtained by drying the polymer dispersant solution obtained in Production Example 1 under reduced pressure were dissolved in 50 parts by mass of methyl ethyl ketone, and 6.7 parts by mass of a neutralizing agent (a 5N sodium hydroxide solution for a volumetric analysis; neutralization degree: 75%) available from Wako Pure Chemical Industries, Ltd., and 250 parts by mass of ion-exchanged water were added to the resulting solution to neutralize a salt-forming group of the resin. Further, 75 parts by mass of PY74 "Fast Yellow 7413-A" as a yellow pigment available from Sanyo Color Works, Ltd., was added to the obtained reaction solution, and the resulting mixture was dispersed by high-speed emulsifying dispersers "T.K. ROBOMIX" and "T.K. HOMODISPER 2.5 MODEL" both available from Primix Corporation at a rotating speed of 8,000 rpm for 60 minutes. Furthermore, the resulting dispersion was subjected to dispersing treatment by passing the dispersion through a Microfluidizer available from Microfluidics Corporation under a pressure of 150 MPa 10 times, thereby obtaining a raw material pigment composition. The pH value of the thus obtained raw material pigment composition was about 12.

Preparation Examples 4 to 7 (Preparation of Raw Material Pigment Compositions)

The same procedure as in Preparation Example 3 was repeated except that the amounts of methyl ethyl ketone and ion-exchanged water were replaced with those amounts shown in Table 4, thereby obtaining raw material pigment compositions.

Example 20

A mixture prepared by mixing 0.272 party by mass of a 37% hydrogen peroxide aqueous solution (0.100 part by mass as hydrogen peroxide) available from Wako Pure Chemical Industries, Ltd., and 40 parts by mass of ion-exchanged water (40.17 parts by mass as a total amount of the ion-exchanged water and water derived from the hydrogen peroxide aqueous solution) was added to 406.7 parts by mass of the raw material pigment composition obtained in Preparation Example 3, followed by stirring the resulting mixture at 60° C. for 6 hours to thereby subject the mixture to a treatment with hydrogen peroxide. As a result, the pH value of the thus obtained crude pigment composition after the treatment with hydrogen peroxide was about 9.

Thereafter, the resulting crude pigment composition was mixed with 250 parts by mass of ion-exchanged water and stirred together therewith, and then the resulting mixture was allowed to stand at 60° C. under reduced pressure to remove methyl ethyl ketone therefrom, followed by further removing a part of water therefrom. Then, ion-exchanged water was added to the resulting mixture to suitably adjust a solid content thereof, thereby obtaining an aqueous pigment dispersion (solid content: 25% by mass).

Three hundred (300) grams of the thus obtained aqueous pigment dispersion were charged into a centrifugal precipitation tube "500PA Bottle" available from Hitachi Koki Co., Ltd., and by using a cooling centrifugal separator "himac CR22G" and a rotor "R12A" (radius: 15.1 cm) both available from Hitachi Koki Co., Ltd., a centrifugal acceleration of 24,300 G was applied thereto at a rotating speed of 12,000 rpm. Then, the resulting dispersion was maintained for 6 minutes under the aforementioned conditions, and then the resulting supernatant solution was separated from the dispersion. The thus separated supernatant solution was subjected to filtration through a 25 mL-capacity needleless syringe available from Terumo Corporation equipped with a surface filtration-type filter having a nominal filtration accuracy of 5 μm (acetyl cellulose membrane; outer diameter: 2.5 cm) available from Sartorius Inc., and then diluted with ion-exchanged water so as to adjust a solid content thereof to 20% by mass, thereby obtaining a pigment composition as the aqueous pigment dispersion of Example 20.

Examples 21 to 23

The same procedure as in Example 20 was repeated except that the amount of the 37% hydrogen peroxide aqueous solution added was controlled such that hydrogen peroxide was added in such an amount as shown in Table 4, thereby obtaining pigment compositions.

Examples 24 to 26

The same procedure as in Example 20 was repeated except that the temperature used upon the treatment with hydrogen peroxide and the amount of hydrogen peroxide added upon the treatment were replaced with those temperatures and amounts as shown in Table 4, respectively, thereby obtaining pigment compositions.

Examples 27 to 30

The same procedure as in Example 20 was repeated except that the raw material pigment composition obtained in Preparation Example 3 was replaced with the respective raw material pigment compositions obtained in Preparation Examples 4 to 7 as shown in Table 4, and the amount of hydrogen peroxide used was replaced with those amounts as shown in Table 4, thereby obtaining pigment compositions.

Example 31

The same procedure as in Example 20 was repeated except that 0.07 part of sodium ascorbate as a reagent available from Wako Pure Chemical Industries, Ltd., was further added upon the treatment with hydrogen peroxide (0.7 as a mass ratio of an amount of ascorbic acid salt added to an amount of hydrogen peroxide added), thereby obtaining a pigment composition.

Comparative Example 2

The same procedure as in Example 20 was repeated except for using no hydrogen peroxide, thereby obtaining a pigment composition.

Evaluation for Ink-Jet Printing

Production Example 2 (Production of Ink)

Twenty five (25) parts by mass of the respective pigment compositions obtained in the aforementioned Examples 20 to 31 and Comparative Example 2 were weighed and filled in a 100 mL glass screw vial. Separately, a 100 mL polypropylene disposable cup was charged with 7 parts by mass of glycerin, 7 parts by mass of triethylene glycol, 5 parts by mass of trimethylol propane, 0.5 part by mass of "ACETYLENOL E100" (an adduct of 2,4,7,9-tetramethyl-5-decyne-4,7-diol with 10 moles of ethyleneoxide) available from Kawaken Fine Chemical Co., Ltd., and 55.5 parts by mass of ion-exchanged water. Then, a cylinder-type magnetic rotor was placed in the disposable cup, and the contents of the disposable cup were mixed while stirring using the magnetic stirrer for 10 minutes to prepare a liquid component constituting an ink. The thus prepared liquid component in the disposable cup was charged together with the cylinder-type magnetic rotor into the glass screw vial filled with 25 parts by mass of the pigment composition, and the contents of the screw vial were stirred for 1 hour and then subjected to filtration through a 25 mL-capacity needleless syringe equipped with a surface filtration-type filter having a nominal filtration accuracy of 5 μm (produced from acetyl cellulose; outer diameter: 2.5 cm) available from Sartorius Inc., thereby obtaining a water-based ink for ink jet printing.

(Evaluation for Ejection Properties)

The water-based ink obtained above was evaluated for ejection properties by the following method.

Using an ink-jet printer "EM930C" commercially available from Seiko Epson Co., Ltd., solid image printing was conducted on 10 sheets of a plain paper "4200" available from Xerox Corporation. The solid image printed on the 10th sheet of the plain paper was observed to count the number of lines (streaks) thereon. Further, the solid image printing on 10 sheets of the plain paper was continuously conducted 10 times until total 100 sheets of the plain paper were printed, in which the number of lines on the solid image every 10 sheets were counted to determine a total number of lines on the 10 solid images as an index of ejection properties of the water-based ink. As the number of lines on the solid image is reduced, occurrence of non-ejection phenomenon owing to ejection defects such as clogging of nozzles, etc., is lessened, and therefore the water-based ink is more excellent in ejection properties.

TABLE 4

| | | | Examples | | | | | | |
|---|---|---|---|---|---|---|---|---|---|
| | | | 20 | 21 | 22 | 23 | 24 | 25 | 26 |
| Raw material pigment composition (part(s) by mass) (% by mass)*1 | Preparation Examples | | Preparation Example 3 | Preparation Example 3 | Preparation Example 3 | Preparation Example 3 | Preparation Example 3 | Preparation Example 3 | Preparation Example 3 |
| | Raw material pigment*2 | | 75 (18) | 75 (18) | 75 (18) | 75 (18) | 75 (18) | 75 (18) | 75 (18) |
| | Ion-exchanged water | | 250 (62) | 250 (62) | 250 (62) | 250 (62) | 250 (62) | 250 (62) | 250 (62) |
| | Polymer dispersant | | 25 (6) | 25 (6) | 25 (6) | 25 (6) | 25 (6) | 25 (6) | 25 (6) |
| | Methyl ethyl ketone | | 50 (12) | 50 (12) | 50 (12) | 50 (12) | 50 (12) | 50 (12) | 50 (12) |
| | 5N NaOH aqueous solution | | 6.7 (2) | 6.7 (2) | 6.7 (2) | 6.7 (2) | 6.7 (2) | 6.7 (2) | 6.7 (2) |
| | Average particle size of aqueous pigment dispersion (nm) | | 120 | 120 | 120 | 120 | 120 | 120 | 120 |

| | | | Examples | | | | | | |
|---|---|---|---|---|---|---|---|---|---|
| | | | 20 | 21 | 22 | 23 | 24 | 25 | 26 |
| Treatment with hydrogen peroxide | Amount added (part(s) by mass) | Hydrogen peroxide*3 | 0.100 | 1.00 | 10.06 | 14.80 | 1.00 | 1.00 | 1.00 |
| | | Ion-exchanged water*4 | 40.17 | 41.71 | 57.14 | 65.20 | 41.71 | 41.71 | 41.71 |
| | | Na ascorbate | 0 | 0 | 0 | 0 | 0 | 0 | 0 |
| | Conditions of treatment | Mass ratio (amount of $H_2O_2$ added/raw material pigment content (*2)) | 0.0013 | 0.013 | 0.13 | 0.20 | 0.013 | 0.013 | 0.013 |
| | | Concentration of $H_2O_2$ in reaction system upon treatment (% by mass) | 0.023 | 0.23 | 2.2 | 3.1 | 0.23 | 0.23 | 0.23 |
| | | Treatment temperature (° C.) | 60 | 60 | 60 | 60 | 20 | 40 | 90 |
| | | Treatment time (hr) | 6 | 6 | 6 | 6 | 6 | 6 | 6 |
| Pigment composition after treatment with hydrogen peroxide | Residual rate of compound (I)*5 | | 20 | 5 | 1 | 1 | 15 | 7 | 4 |
| | Average particle size of aqueous pigment dispersion (nm) | | 120 | 120 | 135 | 155 | 120 | 120 | 135 |

TABLE 4-continued

| Evaluation for ink-jet printing | Ejection properties (number of missing nozzles) | 1 | 0 | 0 | 2 | 2 | 0 | 2 |

| | | Examples | | | | | Comparative |
| --- | --- | --- | --- | --- | --- | --- | --- |
| | | 27 | 28 | 29 | 30 | 31 | Example 2 |
| Raw material pigment composition (part(s) by mass) (% by mass)*1 | Preparation Examples | Preparation Example 4 | Preparation Example 5 | Preparation Example 6 | Preparation Example 7 | Preparation Example 3 | Preparation Example 3 |
| | Raw material pigment*2 | 75 (18) | 75 (18) | 75 (18) | 75 (18) | 75 (18) | 75 (18) |
| | Ion-exchanged water | 300 (74) | 297 (73) | 290 (72) | 210 (52) | 250 (62) | 250 (62) |
| | Polymer dispersant | 25 (6) | 25 (6) | 25 (6) | 25 (6) | 25 (6) | 25 (6) |
| | Methyl ethyl ketone | 0 (0) | 3 (1) | 10 (2) | 90 (22) | 50 (12) | 50 (12) |
| | 5N NaOH aqueous solution | 6.7 (2) | 6.7 (2) | 6.7 (2) | 6.7 (2) | 6.7 (2) | 6.7 (2) |
| | Average particle size of aqueous pigment dispersion (nm) | 120 | 120 | 120 | 120 | 120 | 120 |

| | | Examples | | | | | Comparative |
| --- | --- | --- | --- | --- | --- | --- | --- |
| | | 27 | 28 | 29 | 30 | 31 | Example 2 |
| Treatment with hydrogen peroxide | Amount added (part(s) by mass) | Hydrogen peroxide*3 | 1.00 | 1.00 | 1.00 | 1.00 | 1.00 | 0 |
| | | Ion-exchanged water*4 | 41.71 | 41.71 | 41.71 | 41.71 | 41.64 | 40.27 |
| | | Na ascorbate | 0 | 0 | 0 | 0 | 0.07 | 0 |
| | Conditions of treatment | Mass ratio (amount of $H_2O_2$ added/raw material pigment content (*2)) | 0.013 | 0.013 | 0.013 | 0.013 | 0.013 | — |
| | | Concentration of $H_2O_2$ in reaction system upon treatment (% by mass) | 0.23 | 0.23 | 0.23 | 0.23 | 0.23 | 0 |
| | | Treatment temperature (° C.) | 60 | 60 | 60 | 60 | 40 | 60 |
| | | Treatment time (hr) | 6 | 6 | 6 | 6 | 6 | 6 |
| Pigment composition after treatment with hydrogen peroxide | Residual rate of compound (I)*5 | | 20 | 15 | 8 | 5 | 5 | 100 |
| | Average particle size of aqueous pigment dispersion (nm) | | 120 | 120 | 120 | 122 | 120 | 120 |
| Evaluation for ink-jet printing | Ejection properties (number of missing nozzles) | | 1 | 1 | 0 | 1 | 0 | 15 |

Meanwhile, the respective asterisked signs shown in Table 4 have the following meanings.

1: The numerical values shown in parentheses in Table 4 indicate contents (% by mass) of respective components in the raw material pigment composition.
2: The raw material pigment content indicates a total content of PY74 and the compound (I) in the raw material pigment composition.
3: Hydrogen peroxide was added in the form of a 37% by mass hydrogen peroxide aqueous solution, and the amount of the 37% by mass hydrogen peroxide aqueous solution added was shown in Table 4.
4: The amount of ion-exchanged water added includes an amount of water derived from the hydrogen peroxide aqueous solution.
5: The residual rate of the compound (I) in the pigment composition was expressed by a relative value of the peak height determined in the respective Examples assuming that the peak height determined in Comparative Example 2 with respect to [M+H]$^+$ ion: 345.1194 $C_{16}H_{17}O_5N_4$ corresponding to the compound (I) was 100.

From Table 4, it was confirmed that the pigment compositions obtained in Examples 20 to 31 had a low residual rate of the compound (I) as compared to the pigment composition obtained in Comparative Example 2, and therefore the contents of the compound (I) in the pigment compositions obtained in Examples 20 to 31 were effectively reduced. In addition, it was confirmed that when using the respective pigment compositions in an ink for ink-jet printing, the pigment compositions obtained in Examples 20 to 31 were excellent in ejection properties as compared to the pigment composition obtained in Comparative Example 2. Also, the difference in average particle size of the respective pigment compositions obtained in Examples 20 to 31 between before and after the treatment with hydrogen peroxide was small as compared to that of the pigment composition obtained in Comparative Example 2, and it is therefore considered that the pigment compositions obtained in Examples 20 to 31 had a less adverse influence on dispersibility of the pigment by the polymer dispersant owing to the treatment with hydrogen peroxide. For this reason, it is considered that when compounding the respective pigment compositions obtained in Examples 20 to 31 in an ink for ink-jet printing, etc., the resulting ink or the like is excellent in storage stability.

INDUSTRIAL APPLICABILITY

When the pigment composition obtained according to the production process of the present invention is used in an ink for ink-jet printing, the resulting ink can be prevented from suffering from ejection defects, and is excellent in storage stability.

The invention claimed is:

1. A process for producing a pigment composition, comprising the step of subjecting a reaction system, comprising a raw material pigment composition comprising C.I. Pigment Yellow 74 and a compound (I) represented by the following formula (I-1) or (I-2), to a treatment with an oxidizing agent, wherein the treatment with the oxidizing agent comprises stirring the reaction system with a stirring blade at a shear rate of not less than $10\ s^{-1}$ and not more than $100{,}000\ s^{-1}$, in which a content of the compound (I) in the pigment composition after the treatment with the oxidizing agent on the basis of a content of the C.I. Pigment Yellow 74 in the pigment composition after the treatment with the oxidizing agent being not more than 1,200 mg/kg:

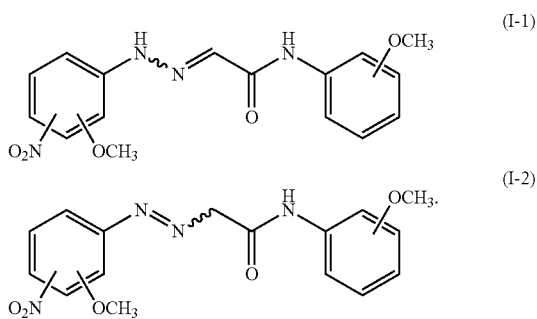

2. The process for producing a pigment composition according to claim 1, wherein the treatment with the oxidizing agent is conducted at a temperature of not lower than 20° C. and not higher than 95° C.

3. The process for producing a pigment composition according to claim 1, wherein the treatment with the oxidizing agent is conducted for a time of not less than 30 minutes and not more than 10 hours.

4. The process for producing a pigment composition according to claim 1, wherein a pH value within the reaction system upon the treatment with the oxidizing agent is not less than 3 and not more than 13.

5. The process for producing a pigment composition according to claim 1, wherein the content of the compound (I) in the pigment composition after the treatment with the oxidizing agent as measured in terms of a residual rate of the compound (I) in the pigment composition on the basis of a content of the compound (I) in the raw material pigment composition before the treatment is not more than 75%.

6. The process for producing a pigment composition according to claim 1, wherein the content of the compound (I) in the pigment composition after the treatment with the oxidizing agent on the basis of the content of the C.I. Pigment Yellow 74 in the pigment composition after the treatment with the oxidizing agent is not more than 650 mg/kg.

7. The process for producing a pigment composition according to claim 1, wherein a concentration of the oxidizing agent in the reaction system upon the treatment with the oxidizing agent is not less than 0.001% by mass and not more than 30% by mass.

8. The process for producing a pigment composition according to claim 1, wherein a total content of the C.I. Pigment Yellow 74 and the compound (I) in the raw material pigment composition is not less than 0.1% by mass and not more than 30% by mass.

9. The process for producing a pigment composition according to claim 1, wherein a content of water in the raw material pigment composition is not less than 50% by mass and not more than 99% by mass.

10. The process for producing a pigment composition according to claim 1, wherein the C.I. Pigment Yellow 74 is produced by a method of subjecting a diazotization product of m-nitro-o-anisidine to coupling reaction with acetoacetic-o-anisidide.

11. The process for producing a pigment composition according to claim 1, wherein the raw material pigment composition is a raw material pigment composition (i) containing the C.I. Pigment Yellow 74, which is obtained by subjecting a diazotization product of m-nitro-o-anisidine to coupling reaction with acetoacetic-o-anisidide, and water, a raw material pigment composition (ii) obtained by mixing the C.I. Pigment Yellow 74 with water, or a raw material pigment composition (iii) formed by dispersing the C.I. Pigment Yellow 74 in water with a polymer dispersant.

12. The process for producing a pigment composition according to claim 11, wherein the polymer dispersant is a synthetic polymer, and the synthetic polymer is in the form of a copolymer containing a constitutional unit derived from a hydrophobic group-containing monomer and a constitutional unit derived from a hydrophilic group-containing monomer.

13. The process for producing a pigment composition according to claim 1, wherein the compound represented by the formula (I-1) is a compound represented by the following formula (I-1-1), and the compound represented by the formula (I-2) is a compound represented by the following formula (I-2-1):

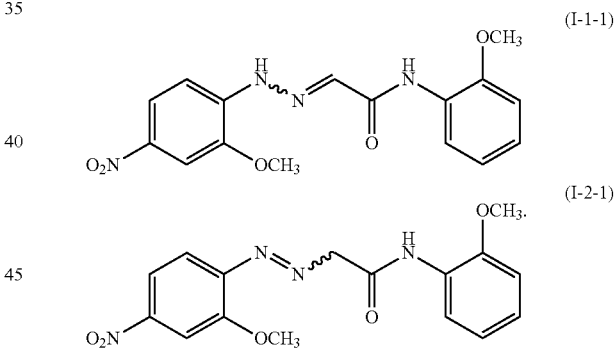

14. The process for producing a pigment composition according to claim 1, wherein the treatment with the oxidizing agent is a treatment with at least one compound selected from the group consisting of a peroxide, and an oxygen acid or a salt thereof.

15. The process for producing a pigment composition according to claim 1, wherein the treatment with the oxidizing agent is a treatment with at least one compound selected from the group consisting of hydrogen peroxide and a hypochlorous acid alkali metal salt.

16. The process for producing a pigment composition according to claim 15, wherein the hypochlorous acid alkali metal salt is sodium hypochlorite.

17. The process for producing a pigment composition according to claim 1, wherein a mass ratio of an amount of the oxidizing agent added to a total content of the C.I. Pigment Yellow 74 and the compound (I) (raw material pigment content) in the raw material pigment composition upon the treatment with the oxidizing agent (amount of oxidizing agent added/raw material pigment content) is not less than 0.001 and not more than 10.

* * * * *